(12) United States Patent
Kanbara

(10) Patent No.: US 8,862,501 B2
(45) Date of Patent: Oct. 14, 2014

(54) SYSTEM, METHOD AND APPARATUS FOR BANNER ADVERTISING CAPABLE OF ALLOWING EASY HANDLING OF A BANNER ADVERTISEMENT

(75) Inventor: Kohji Kanbara, Kanagawa-ken (JP)

(73) Assignee: Ricoh Co., Ltd., Tokyo (JP)

( * ) Notice: Subject to any disclaimer, the term of this patent is extended or adjusted under 35 U.S.C. 154(b) by 2351 days.

(21) Appl. No.: 10/670,247

(22) Filed: Sep. 26, 2003

(65) Prior Publication Data

US 2004/0117258 A1  Jun. 17, 2004

(30) Foreign Application Priority Data

Sep. 26, 2002 (JP) .................................. 2002-281778

(51) Int. Cl.
*G06Q 30/02* (2012.01)
(52) U.S. Cl.
CPC ............ *G06Q 30/02* (2013.01); *G06Q 30/0277* (2013.01); *G06Q 30/0273* (2013.01)
USPC ..................................... 705/14.69; 705/14.73
(58) Field of Classification Search
CPC ........................ G06Q 30/0273; G06Q 30/0277
USPC ....................... 705/14, 14.69, 14.73
See application file for complete search history.

(56) References Cited

U.S. PATENT DOCUMENTS

| | | | | |
|---|---|---|---|---|
| 5,070,467 A * | 12/1991 | Todome | .......................... | 345/502 |
| 5,937,150 A | 8/1999 | Phan | | |
| 6,286,045 B1 * | 9/2001 | Griffiths et al. | ................ | 709/224 |
| 6,462,839 B1 * | 10/2002 | Short | ............................ | 358/474 |
| 6,615,183 B1 * | 9/2003 | Kolls | ............................... | 705/26 |
| 7,933,802 B2 * | 4/2011 | Plow et al. | ................... | 705/14.73 |
| 7,962,363 B2 * | 6/2011 | Patel et al. | ..................... | 705/14.4 |
| 2004/0117258 A1 * | 6/2004 | Kanbara | .......................... | 705/14 |

FOREIGN PATENT DOCUMENTS

| | | |
|---|---|---|
| CN | 1166659 A | 12/1997 |
| CN | 1201179 A | 12/1998 |
| CN | 1346199 A | 4/2002 |
| CN | 1357193 A | 7/2002 |
| CN | 1363060 A | 8/2002 |
| EP | 0 778 692 A2 | 6/1997 |
| JP | 2001-217978 | 8/2001 |
| JP | 2000-059554 | 2/2002 |
| KR | 2001-0035021 | 5/2001 |
| WO | WO 00/57624 A2 | 9/2000 |
| WO | WO 01/57610 A2 | 8/2001 |

OTHER PUBLICATIONS

"define: mechanism" Google search performed Jul. 2, 2009 and repeated Jul. 17, 2009 to correct a defect.*

(Continued)

*Primary Examiner* — Donald L. Champagne
(74) *Attorney, Agent, or Firm* — Oblon, Spivak, McClelland, Maier & Neustadt, L.L.P.

(57) ABSTRACT

A banner advertisement system includes an advertisement terminal, a banner advertisement server, and an image forming apparatus. The advertisement terminal generates a banner advertisement. The banner advertisement server distributes the banner advertisement generated by the advertiser terminal. The image forming apparatus includes a displaying mechanism for displaying the banner advertisement distributed by the banner advertisement server and a response sending mechanism for sending to the advertiser terminal at least one of an order and an inquiry for at least one of a product and services offered by the banner advertisement displayed on the displaying mechanism.

9 Claims, 18 Drawing Sheets

(56) References Cited

OTHER PUBLICATIONS

"Web banner", Wikipedia article downloaded Jun. 7, 2014 from http://en.wikipedia.org/wiki/Web_banner.*
Office Action issued Feb. 17, 2006 in Chinese Patent Application No. 03159784X.
Office Action issued Dec. 1, 2006 in Chinese Patent Application No. 03159784X.
Office Action issued Mar. 23, 2007 in Chinese Patent Application No. 03159784X.
Office Action issued Jun. 22, 2005 in Korean Patent Application No. 10-2003-0066465.

* cited by examiner

FIG. 10

| A1 | A2 | A3 | A4 | A5 |
|---|---|---|---|---|
| 148858 | ABC COMPANY | abc@abc... | BANK TRANSFER | BANK TRANSFER |
| 457187 | DEF COMPANY | def@def... | BANK TRANSFER | BANK TRANSFER |
| 524399 | GHI COMPANY | ghi@ghi... | CASH | CASH |
| .. | .. | .. | .. | .. |

| A1 | B1 | B2 | B3 | B4 | B5 |
|---|---|---|---|---|---|
| 148858 | 214587 | 10 | 2001/4/1~2001/4/30 8:30~10:30 | WORLD FIRST - - - - | DATA 1 |
| 457187 | 354876 | 2 | 2001/4/8~2001/6/7 0:00~24:00 | NEW MODEL OF - - - - | DATA 2 |
| 524399 | 102546 | 1 | 2001/4/8~2001/4/8 0:00~24:00 | LAUNCH OF A - - - - | DATA 3 |
| 000000 | 000000 |  | 2001/4/8~2001/4/15 0:00~24:00 | NEWEST MUSIC - - - - | DATA 4 |
| .. | .. |  |  | .. | .. |

| C1 | C2 | C3 | C4 |
|---|---|---|---|
| 423049 | XYZ COMPANY | xyz@xyz... | BANK TRANSFER |
| 267396 | STU COMPANY | stu@stu... | MAIL TRANSFER |
| 047791 | OPQ COMPANY | opq@opq... | BANK TRANSFER |
| .. | .. | .. | .. |

| B1 | D1 | D2 | D3 | D4 |
|---|---|---|---|---|
| 423049 | 111001 | 111.222.333.444 | 1, 3, ... | 1, 10, ... |
| 267396 | 231556 | 123.234.345.456 | 2, ... | 4, 5, ... |
| 047791 | 109870 | 999-999-9999 | 2, 3, ... | 10, ... |
| .. | .. | .. | .. | .. |

| B1 | B3 | B4 | B5 | A1 | A3 | E1 |
|---|---|---|---|---|---|---|
| | | | | | | 114 |
| 214587 | 2001/4/1~2001/4/30 8:30~10:30 | WORLD FIRST - - - | DATA 1 | 148858 | abc@abc... | 40 |
| 354876 | 2001/4/8~2001/6/7 0:00~24:00 | NEW MODEL OF - - - | DATA 2 | 457187 | def@def... | 50 |
| 102546 | 2001/4/8~2001/4/8 0:00~24:00 | LAUNCH OF A - - - | DATA 3 | 524399 | ghi@ghi... | 30 |
| 000000 | 2001/4/8~2001/4/15 0:00~24:00 | NEWEST MUSIC - - - | DATA 4 | 000000 | jkl@jkl... | 20 |
| .. | .. | .. | .. | .. | .. | .. |

|   B1   |  E2  |
|--------|------|
| 214587 |  40  |
| 354876 |  20  |
| 102546 |  80  |
|   :    |   :  |

| D1 | B1 | E2 | E4 |
|---|---|---|---|
| 111001 | 214587 | 40 | 4 |
| 111001 | 354876 | 20 | 5 |
| 111001 | 102546 | 80 | 8 |
| ⋮ | ⋮ | ⋮ | ⋮ |
| 231556 | 444768 | 12 | 1 |
| 231556 | 411156 | 26 | 2 |
| 231556 | 167855 | 104 | 10 |
| ⋮ | ⋮ | ⋮ | ⋮ |
| 109870 | 114672 | 10 | 1 |
| 109870 | 734575 | 16 | 1 |
| 109870 | 214587 | 13 | 1 |
| ⋮ | ⋮ | ⋮ | ⋮ |

| A1 | B1 | E5 |
|---|---|---|
| 148858 | 214587 | 56,832 yen |
| 457187 | 354876 | 14,443 yen |
| 524399 | 102546 | 572,205 y n |
| ⋮ | ⋮ | ⋮ |

| C1 | D1 | E6 |
|---|---|---|
| 423049 | 111001 | 1,330,223 yen |
| 267396 | 231556 | 459,328 yen |
| 047791 | 109870 | 860,457 yen |
| ⋮ | ⋮ | ⋮ |

| D1 | B1 | E7 |
|---|---|---|
| 111001 | 214587 | 40 |
| 111001 | 354876 | 20 |
| 111001 | 102546 | 80 |
| ⋮ | ⋮ | ⋮ |
| 231556 | 444768 | 12 |
| 231556 | 411156 | 26 |
| 231556 | 167855 | 104 |
| ⋮ | ⋮ | ⋮ |
| 109870 | 114672 | 10 |
| 109870 | 734575 | 16 |
| 109870 | 214587 | 13 |
| ⋮ | ⋮ | ⋮ |

SYSTEM, METHOD AND APPARATUS FOR BANNER ADVERTISING CAPABLE OF ALLOWING EASY HANDLING OF A BANNER ADVERTISEMENT

BACKGROUND OF THE INVENTION

1. Field of the Invention

The present invention relates to a system, method, and apparatus for banner advertising, and more particularly to a system, method and apparatus for banner advertising capable of allowing an easy handling of an order and an inquiry for a product and services on a banner advertisement.

2. Discussion of the Background

A digital image forming apparatus which integrates multiple functions including printing, copying, facsimile functions, and scanning has recently been developed. In this digital image forming apparatus, one main body is provided with an operation display unit, a printing mechanism, and an image reading mechanism as well as four kinds of applications corresponding to the printing, copying, facsimile, and scanning functions. By switching these four applications, the digital image forming apparatus is capable of performing the above-mentioned multiple functions.

Referring to FIG. 1, an exemplary way of a maintenance service system relative to the above-mentioned digital image forming apparatus is explained. FIG. 1 illustrates an exemplary data flow between an image forming apparatus 2000 and a maintenance service server 3000 via a public switched telephone network 1000.

One example of the maintenance service system is illustrated in FIG. 1, in which the maintenance service server 3000 communicates with the image forming apparatus 2000 via the public switched telephone network 1000 to collect various kinds of information including machine usage data indicative of a number of performance times with respect to an image forming operation, toner data indicative of an amount of toner left in the image forming apparatus 2000, and so on. The maintenance service server 3000 calculates a maintenance service fee and offers an exchange of toner bottles, for example, based on the information collected from the image forming apparatus 2000.

Another example of the maintenance service system is described in Japanese Laid-Open Patent Application Publication, No. 2000-59554. This maintenance service system is illustrated in FIG. 2, in which an image forming apparatus 6000 at a user site is connected to a public switched telephone network 5000 via a modem 7000, and an information distribution server 8000 at a maintenance provider side is connected to the public switched telephone network 5000 via a model 9000.

In this maintenance service system, the information distribution server distributes information such as advertisements at predetermined intervals to the specified image forming 6000 which is a specified apparatus. With this configuration, the information such as advertisements held in the image forming apparatus 6000 is displayed on an operation display panel when the image forming apparatus performs an image forming operation.

As another example, a banner advertisement is publicly known to display an advertisement on a terminal at a user side. In the banner advertisement, however, a click ratio has been declined in recent years and, as a result, a ratio that the banner advertisement yields sales results is lowered.

Under the circumstances, the banner advertisement industry tries various kinds of attempts to increase the click ratio, such as animating advertisements, emphasizing characters using colors, special forms, etc.

In the background maintenance service system, however, the advertisements displayed on the display panel of the image forming apparatus at the user side may not necessarily be fit for a user preference. Even if the advertisements are fit for a user preference, the user cannot take an immediate action since the background image forming apparatus does not have a function to place an order or an inquiry for a product or services displayed on the banner advertisement. In addition, the user needs to be attending the image forming apparatus to see the banner advertisements, which is not a quite an advantage for the banner advertisement. Furthermore, the advertiser of the banner advertisement needs to establish a collection system for collecting maintenance service fees from users. For the users, it is not a merit to keep the display power on for such an advertisement including unconcerned information.

SUMMARY OF THE INVENTION

In view of the foregoing, it is an object of the present invention to provide a novel banner advertisement system which allows an easy handling of ordering and inquiring for a banner advertisement.

Another object of the present invention is to provide a novel banner advertisement method which allows an easy handling of ordering and inquiring for a banner advertisement.

Another object of the present invention is to provide a novel banner advertisement server which allows an easy handling of ordering and inquiring for a banner advertisement.

Another object of the present invention is to provide a novel an image forming apparatus which allows an easy handling of ordering and inquiring for a banner advertisement.

Another object of the present invention is to provide a novel an information processing apparatus which allows an easy handling of ordering and inquiring for a banner advertisement.

To achieve the above-mentioned object, in one example, a novel banner advertisement system includes an advertisement terminal, a banner advertisement server, and an image forming apparatus. The advertisement terminal generates a banner advertisement. The banner advertisement server is configured to distribute the banner advertisement generated by the advertiser terminal. The image forming apparatus includes a displaying mechanism configured to display the banner advertisement distributed by the banner advertisement server and a response sending mechanism configured to send to the advertiser terminal at least one of an order and an inquiry for at least one of a product and services offered by the banner advertisement displayed on the displaying mechanism.

The displaying mechanism may include a touch-sensing panel display.

In one example, a banner advertisement method includes the steps of providing generating, distributing, displaying, and sending. The providing step provides an image forming apparatus comprising a display. The generating step generates a banner advertisement at a banner advertiser terminal. The distributing step distributes the banner advertisement generated by the generating step to the image forming apparatus. The displaying step displays the banner advertisement distributed by the distributing step on the display of the image forming apparatus. The sending step sends at least one of an order and an inquiry for at least one of a product and services offered by the banner advertisement displayed by the displaying step from the image forming apparatus to the banner advertiser terminal.

In one example, a banner advertisement server includes a communications interfacing mechanism, an advertisement distributing mechanism, a data collecting mechanism, a point, converting mechanism, and an accumulating mechanism. The communications interfacing mechanism is configured to electrically communicate via a network with a plurality of image forming apparatuses capable of displaying a banner advertisement, sending an order for at least one of a product and services offered by the banner advertisement, and storing data of the order. The advertisement distributing mechanism is configured to distribute the banner advertisement to the plurality of image forming apparatuses through the communications mechanism. The data collecting, mechanism is configured to collect the data of the order from the plurality of image forming apparatuses through the communications mechanism. The point converting mechanism is configured to convert the data of the order into points for the plurality of image forming apparatuses. The accumulating mechanism is configured to accumulate the points for the plurality of image forming apparatuses.

In the above-mentioned banner advertisement server may further includes a fee collecting mechanism configured to collect fees for the at least one of the product and the services from users of the plurality of image forming apparatuses for a banner advertiser through the communications mechanism.

The advertisement distributing mechanism may distribute the banner advertisement through the communications mechanism to the plurality of image forming apparatuses which are in a non-operative state.

In one example, an image forming apparatus includes a communications interfacing mechanism, a displaying mechanism, and a response sending mechanism. The communications interfacing mechanism is configured to communicate with a banner advertiser terminal via a network. The displaying mechanism is configured to display a banner advertisement offering at least one of a product and services. The response sending mechanism is configured to send to the banner advertiser terminal, through the communications mechanisms, at least one of an order and an inquiry for the at least one of the product and the services offered by the banner advertisement displayed on the displaying mechanism.

The displaying mechanism may display the banner advertisement when the image forming apparatus is in a non-operative state.

The communications mechanism may receive a return message in an electronic mail form from the banner advertiser terminal in response to the at least one of the order and the inquiry for the at least one of the product and the services sent by the response sending mechanism.

The above-mentioned image forming apparatus may further include a downloading mechanism configured to download a return message in a printable form from the banner advertiser terminal in response to the at least one of the order and the inquiry for the at least one of the product and the services sent by the response sending mechanism.

The above-mentioned image forming apparatus may further include an advertisement registering mechanism configured to access a banner advertisement server to register a banner advertisement.

The displaying mechanism may include a touch-sensing panel display.

In one example, an information processing apparatus includes a communications interface and a displaying mechanism. The communications interface is configured to communicate with an image forming apparatus via a network. The displaying mechanism is configured to display a banner advertisement which is distributed to the image forming apparatus when the image forming apparatus is in a non-operative state.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a data table of a banner advertiser data base connected to the banner advertisement server of FIG. 8;

FIG. 11 is a data table of a distributive banner advertisement content data base connected to the banner advertisement server of FIG. 8;

FIG. 12 is a data table of a client data base connected to the banner advertisement server of FIG. 8;

FIG. 13 is a data table of an apparatus data base connected to the banner advertisement server of FIG. 8;

FIG. 14 is a data table of a banner advertisement content data base connected to the image forming apparatus of FIG. 8;

FIG. 21 is a data table of a service ordering consolidation data base connected to the banner advertisement server of FIG. 8;

FIG. 22 is a data table of a banner advertisement fee data base connected to the banner advertisement server of FIG. 8;

FIG. 23 is a data table of a maintenance fee data base connected to the connected to the banner advertisement server of FIG. 8;

FIG. 24 is a data table of a service provision consolidation data base connected to the banner advertisement server of FIG. 8;

DETAILED DESCRIPTION OF PREFERRED EMBODIMENTS

Figure 1:
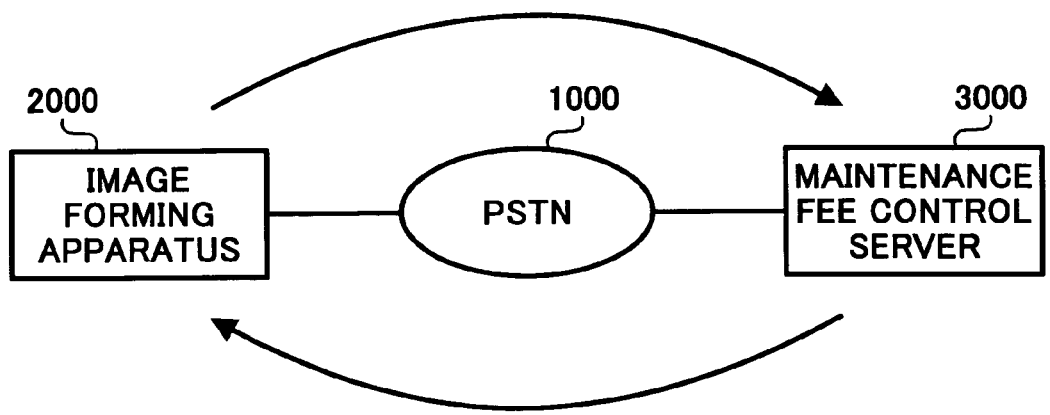
FIG. 1 is a block diagram of a background data exchange system.
Figure 2:
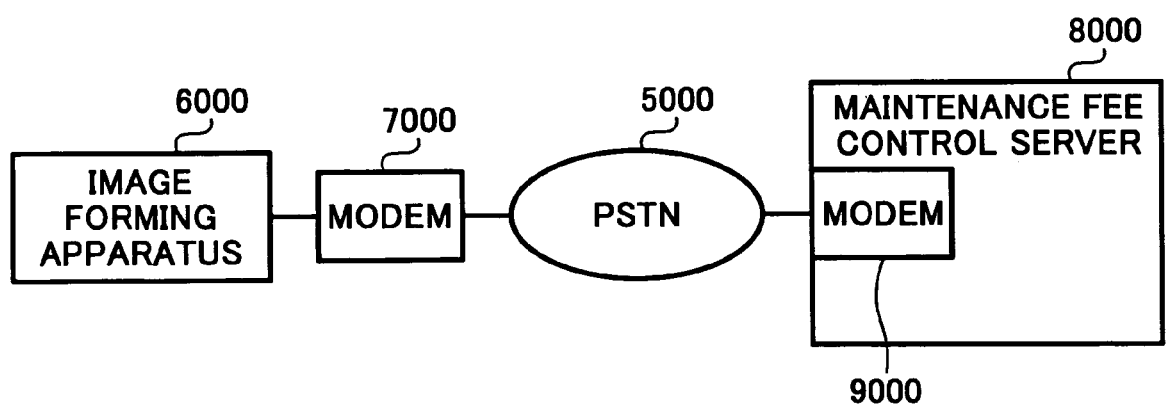
FIG. 2 is a block diagram of another background data exchange system.
Figure 3:
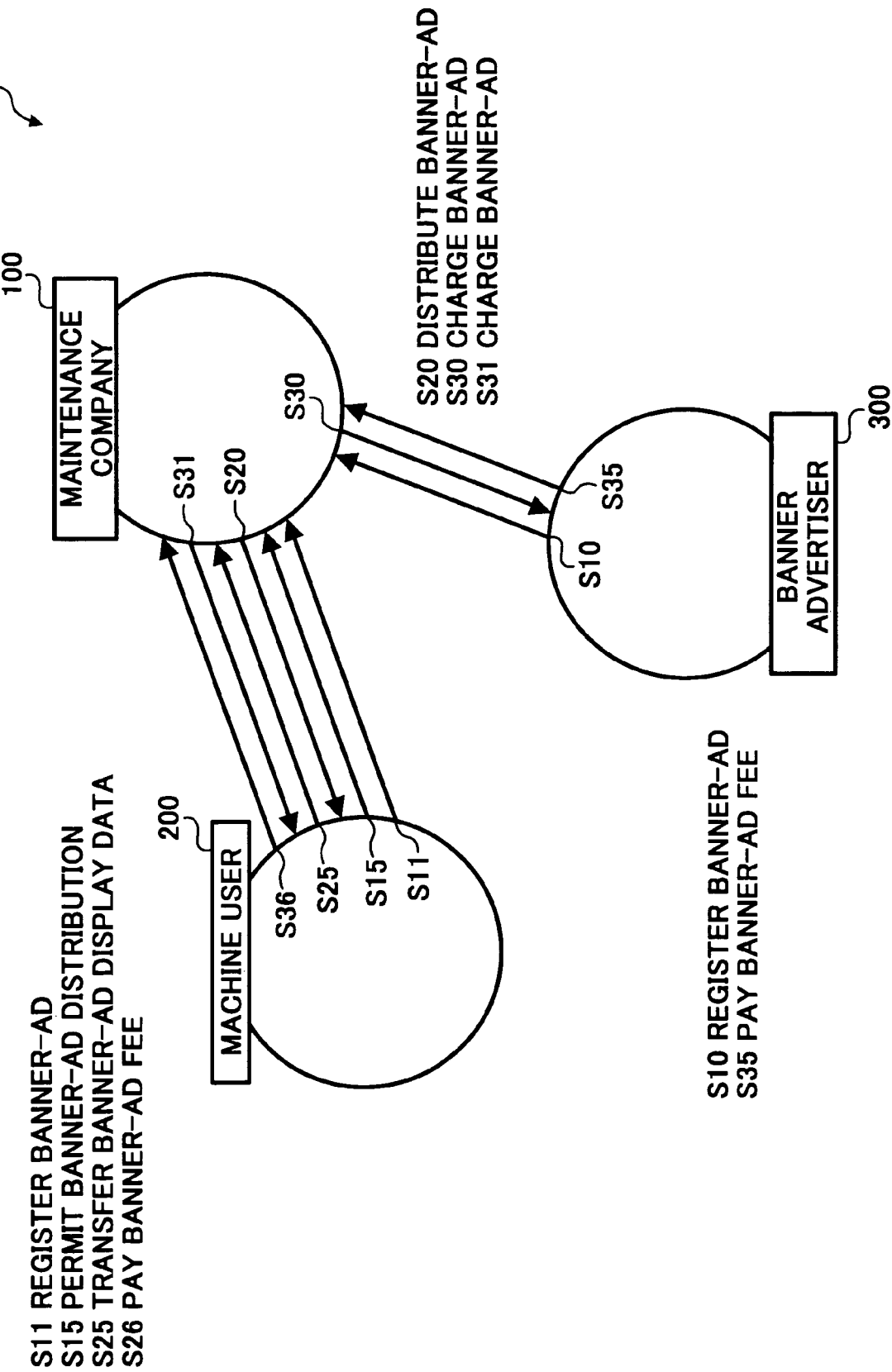
FIG. 3 is a schematic diagram showing an exemplary procedure of a banner advertisement system according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a banner-advertisement ordering system 1 according to an exemplary embodiment of the present invention is explained. FIG. 3 shows the banner-advertisement ordering system 1 which includes a machine user 200 using an image forming apparatus, a maintenance company 100, and a banner advertiser 300. FIG. 3 is an illustration conceptually illustrating an exemplary data and monetary flow in various operational steps from registering a banner advertisement to paying banner-advertisement fees among the machine user 200, the maintenance company 100, and the banner advertiser 300 in the banner-advertisement ordering system 1 according to the preferred embodiment of the present invention.

In FIG. 3, the banner advertiser 300 registers a banner advertisement for the machine user 200 with the maintenance company 100, in Step S10. The machine user 200 can also register a banner advertisement with the maintenance company 100, in Step S11.

Then, in Step S15, the machine user 200 gives the maintenance company 100 permission to distribute the registered banner advertisement. In response, in Step S20, the maintenance company 100 distributes the registered banner advertisement to the machine user 200 who has given the permission to distribute the banner advertisement when an image forming apparatus that the machine user 200 uses is in a non-operative state.

Then, in Step S25, the maintenance-company 100 collects data indicating a number of displayed banner advertisements which is recorded in the machine user 200. In Step S30, the maintenance company 100 charges the banner advertiser 300 for the banner advertisements based on the number of displayed banner advertisements collected from the machine user 200. Likewise, it is impossible that the maintenance company 100 distributes the banner advertisement registered by the machine user 200 in Step S11 to a different machine user and, collects data indicating a number of displayed banner advertisements from the different machine user. In this case, the maintenance company 100 also charges the machine user 200 in Step S31 for the banner advertisements based on the data indicating the number of displayed banner advertisements collected from the different machine user. Then, the banner advertiser 300 pays the amounts charged for the banner advertisements to the maintenance company 100 in Step S35, and the machine user 200 pays in Step S36.

Figure 4:
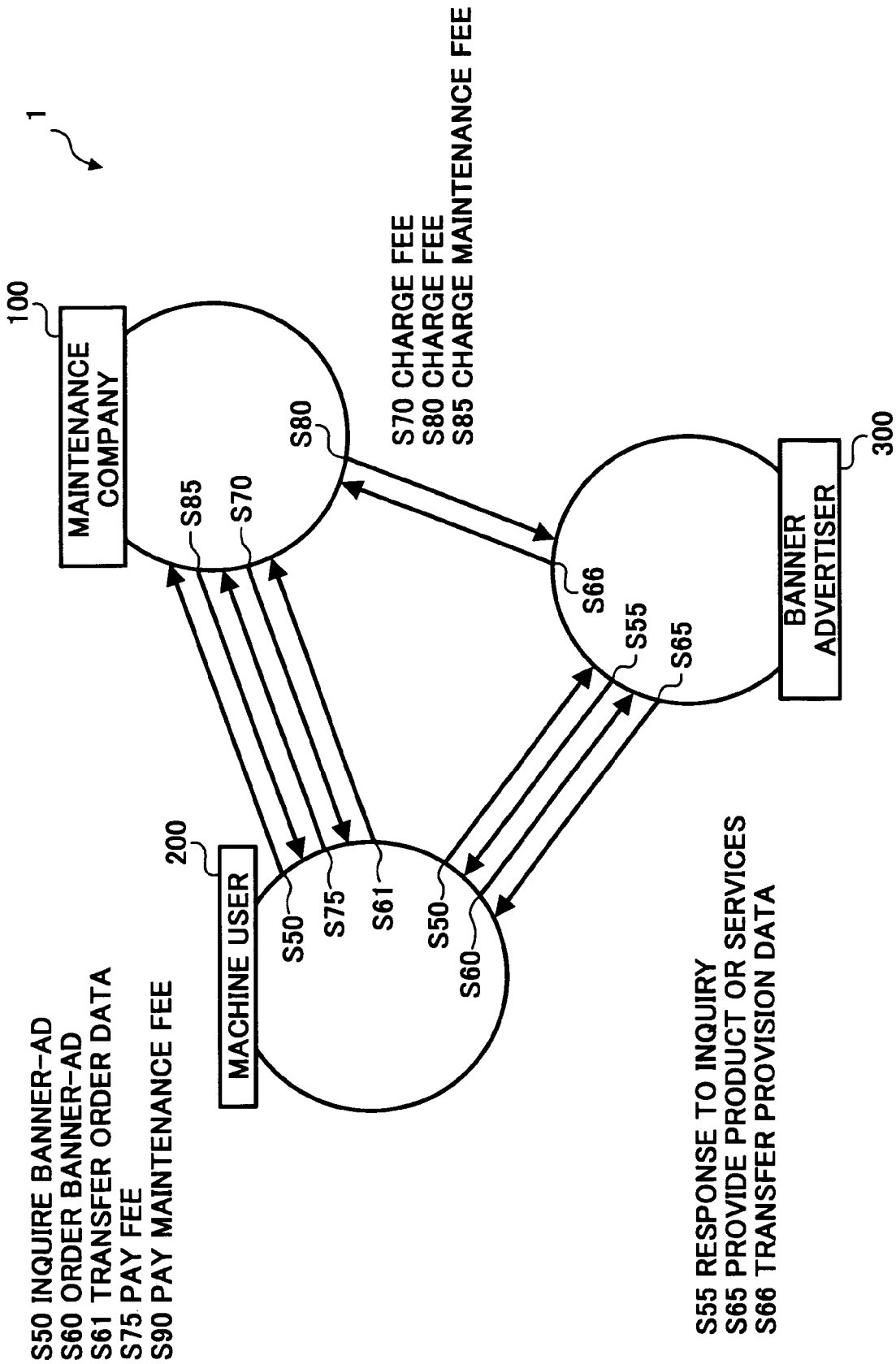
FIG. 4 is a schematic diagram showing another exemplary procedure of a banner advertisement system according to an exemplary embodiment of the present invention.

Referring to FIG. 4, an exemplary data and monetary flow in various operational steps from ordering of banner advertisement to payment of maintenance fees among the machine user 200, the maintenance company 100, and the banner advertiser 300 in the banner-advertisement ordering system 1 according to the preferred embodiment of the present invention.

In Step S50 of FIG. 4, the machine user 200 sends an inquiry to the banner advertiser 300 about a product or services on the banner advertisement displayed on a touch-sensing panel display of the image forming apparatus that the machine user 200 uses, at a time other than the time the machine user manipulates the image forming apparatus. Upon receiving the inquiry, in Step S55, the banner advertiser 300 sends back a response to the machine user 200 by e-mail or to inform that the machine user 200 can print necessary information through downloading. The machine user 200 receives the response by e-mail from the banner advertiser 300 or prints the response through downloading, using the image forming apparatus that the machine user 200 uses.

Then, in Step S60, the machine user 200 orders to the banner advertiser 300 an advertised product or services displayed on the touch-sensing panel display. In Step S61, the maintenance company 100 collects data with respect to the order for the advertised product or services sent by the machine user 200 in Step S60. The maintenance company 100 converts the collected ordering data into points and accumulates the points by each image forming apparatus.

In Step S65, the banner advertiser 300 provides the machine user 200 with the advertised product or services in response to the order sent in Step S61. Also, the maintenance company 100 collects data indicating a delivery of the product or services from the banner advertiser 300, in Step S66. Then, in Step S70, the maintenance company 100 charges the machine user 200 for the delivered product or services based on the data for the delivery of the product or services collected from the banner advertiser 300 in Step S66. Then, in Step S75, the machine user 200 pays the amount charged in Step S70 to the maintenance company 100. In Step S80, the maintenance company 100 pays to the banner advertiser 300 an amount which is calculated by subtracting a collection margin from the collected amount from the machine user 200.

Further, the maintenance company 100 converts the data indicating the displayed banner advertisements collected in Step S25 and the ordering data collected in Step S61 into points, calculates a discount amount of the maintenance fee for the image forming apparatus that the machine user 200 uses in accordance with the accumulated points, and charges the discounted maintenance fee to the machine user 200, in Step S85.

Then, in Step S90, the machine user 200 pays the charged discounted maintenance fee to the maintenance company 100.

Figure 5:
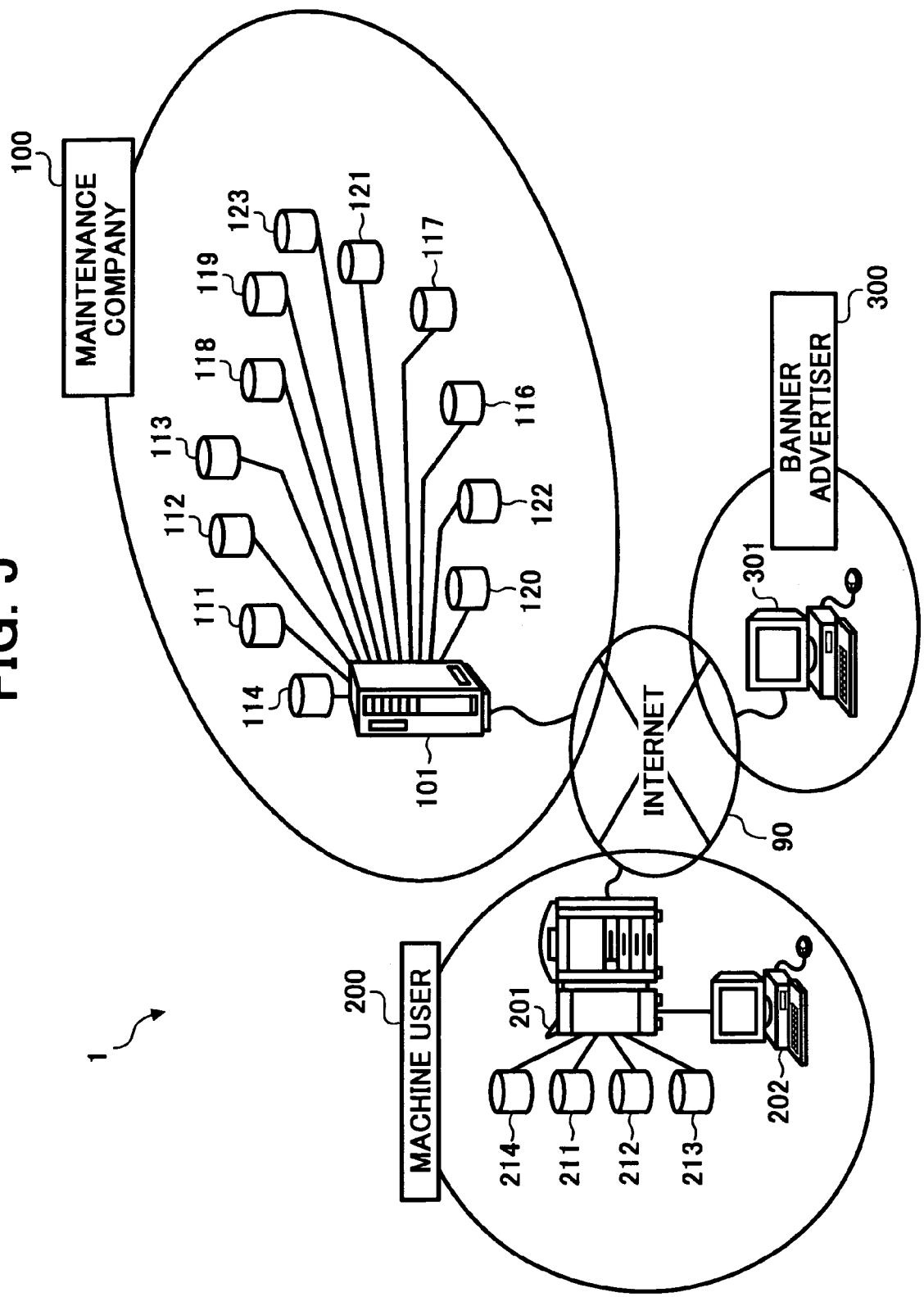
FIG. 5 is a block diagram of the banner advertisement system described with reference to FIGS. 3 and 4.

Referring to FIG. 5, an exemplary structure of the banner-advertisement ordering system 1 shown in FIGS. 3 and 4 is explained in detail. As described above, the banner-advertisement ordering system 1 is capable of enabling the machine user 200 to order services and product displayed on the touch-sensing panel display of the image forming apparatus of the machine user 200. In this discussion, however, the machine user 200 orders services but not product, for the sake of simplicity.

As shown in FIG. 5, the machine user 200 includes an image forming apparatus 201 that is the one the machine user 200 uses, and a user terminal 202. The machine user 200 further include a banner advertisement content data base (ACDB) 211, a counter data base (CTDB) 212, a service order data base (SODB) 213, and a banner advertiser data base (ADDB) 214. The image forming apparatus 201 is connected to the user terminal 202, the ACDB 211, the CTDB 212, the SODB 213, and the ADDB 214. The image forming apparatus 201 is also connected to an Internet 90.

The data base 211 stores banner-advertisement data includes contents of banner-advertisements distributed from the maintenance company 100, counter data of banner-advertisements which are displayed, and so forth. The CTDB 212 stores data indicating a number of times the image forming operation is carried out on the image forming apparatus 201. The SODB 213 stores data indicating service ID (identification) for identifying services advertised on the touch-sensing panel display, service ordering information including a number of times of ordering services, information of banner advertiser 300 who registers the banner advertisement displayed on the touch-sensing panel display, and so forth.

The image forming apparatus 201 includes a touch-sensing panel display and has a function for ordering or inquiring services advertised on the touch-sensing panel display to the banner advertiser 300 with referring to the banner-advertiser's information storing in the data base 213. The image forming apparatus 201 receives a response from the banner advertiser 300 in a form of e-mail or a printed form through downloading.

The user terminal 202 transmits image data to the image forming apparatus 201 to form an image according to the image data on the image forming apparatus 201, and displays on its own display a banner advertisement which is distributed during a time the image forming apparatus 201 is in a non-operative state.

The image forming apparatus 201 has a communications function using a terminal adapter directly connected to the Internet 90. As an alternative, it is also possible for the image forming apparatus 201 to have a communications function using a modem connected to a telephone line.

The maintenance company 100 includes a banner advertisement server 101, a banner advertiser data base (BADB) 111, a client data base (CTDB) 112, an apparatus data base (APDB) 113, a distributive banner-advertisement content data base (DCDB) 114, a service ordering consolidation data base (OCDB) 116, a counter data consolidation data base (CCDB) 117, a banner advertisement fee data base (AFDB) 118, a maintenance fee data base (MFDB) 119, a service provision consolidation data base (PCDB) 120, a service fee data base (SFDB) 121, a displayed banner-advertisement consolidation data base (DBACDB) 122, and a service provision fee data base (PFDB) 123. The banner advertiser 300 includes a banner advertiser terminal 301 connected to the Internet 90.

Thus, the image forming apparatus 201, the banner advertisement server 101, and the banner advertiser terminal 301 communicate each other through the Internet 90. As an alternative, it is also possible to provide a private line between these machines to enable them to communicate each other through the private line using the Internet 90.

The banner advertisement server 101 transmits banner advertisement contents and various kinds of data which have been registered by the banner advertiser terminal 301 through the Internet 90 to the image forming apparatus 201 when the image forming apparatus 201 is in a non-operative state. In this process, the banner advertisement server 101 can determine whether the image forming apparatus 201 is in a non-operative state by sending a signal to the image forming apparatus 201 in a periodical fashion. As an alternative, statuses whether the image forming apparatus 201 is in a non-operative state or not are monitored by a server and the banner advertisement server 101 collects such monitoring information from the server.

The banner advertisement server 101 periodically collects the banner advertisements stored in the ACDB 211 to calculate a banner advertisement fee payable to the banner advertiser 300, and stores the calculated banner advertisement fee into the AFDB 118. The banner advertisement server 101 also collects information indicating a bank account of the banner advertiser 300 stored in the BADB 111 and transfers the calculated banner advertisement fee from this bank account of the banner advertiser 300 by referring to the data of the AFDB 118.

The banner advertisement server 101 periodically collects the information stored in the CTDB 212 and indicating the number of times the image forming operation is carried out on the image forming apparatus 201, which information is referred to as counter data. The banner advertisement server 101 stores the collected counter data into the TCDB 117. Based on the stored counter data, the banner advertisement server 101 calculates a maintenance fee which is a basic fee to each of contracted image forming apparatuses including the image forming apparatus 201. As an alternative to the collective operation by the banner advertisement server 101, the image forming apparatus 201 can periodically transmits the counter data to the banner advertisement server 101.

Further, the banner advertisement server 101 periodically collects the ordering data indicative of orders of services expressed by the banner advertisement stored in the SODB 213, and converts the ordering data into points. The banner advertisement server 101 stores the converted points into the OCDB 116. The banner advertisement server 101 accumulates the points by each of the contracted image forming apparatuses including the image forming apparatus 201, and discounts the maintenance fees for the contracted image forming apparatuses including the image forming apparatus 201 in accordance with the respective points. As an alternative to the collective operation by the banner advertisement server 101, the image forming apparatus 201 can transmit the ordering data to the banner advertisement server 101 each time the image forming apparatus 201 places an order for the services.

Further, the banner advertisement server 101 periodically collects service delivery data stored in the banner advertiser terminal 301 and indicating data of delivering services to the image forming apparatus 201 in response to its order, and stores the service delivery data into the PCDB 120. As an alternative to the collective operation by the banner advertisement server 101, the banner advertiser terminal 301 can transmit the service delivery data to the banner advertisement server 101 each time the banner advertiser terminal 301 deliver the services in response to the order placed by the image forming apparatus 201.

The banner advertisement server 101 calculates a service use fee for the use of the services by the machine user 200 based on the collected service delivery data, and stored the calculated service use fee into the SFDB 121. Then, the banner advertisement server 101 collects information indicating a bank account of the machine user 200 stored in the CTDB 112 and transfers the calculated service use fee from this bank account of the machine user 200 by referring to the data of the SFDB 121.

Further, the banner advertisement server 101 compiles the service use fees by each of contracted banner advertisers including the banner advertiser 300, and stores the compiled service use fees into the PFDB 123. Then, the banner advertisement server 101 calculate an amount payable to the banner advertiser 300 by subtracting a margin for the collection of the service use fee from the collected service use, and transfers the calculated amount to the bank account of the banner advertiser 300 stored in the BADB 111.

In FIG. 5, as an alternative to the Internet connection, lines connecting the image forming apparatus 201, the banner advertisement server 101, and the banner advertiser terminal 301 to each other can be a public switched telephone network (PSTN), each using a modem.

Figure 6:
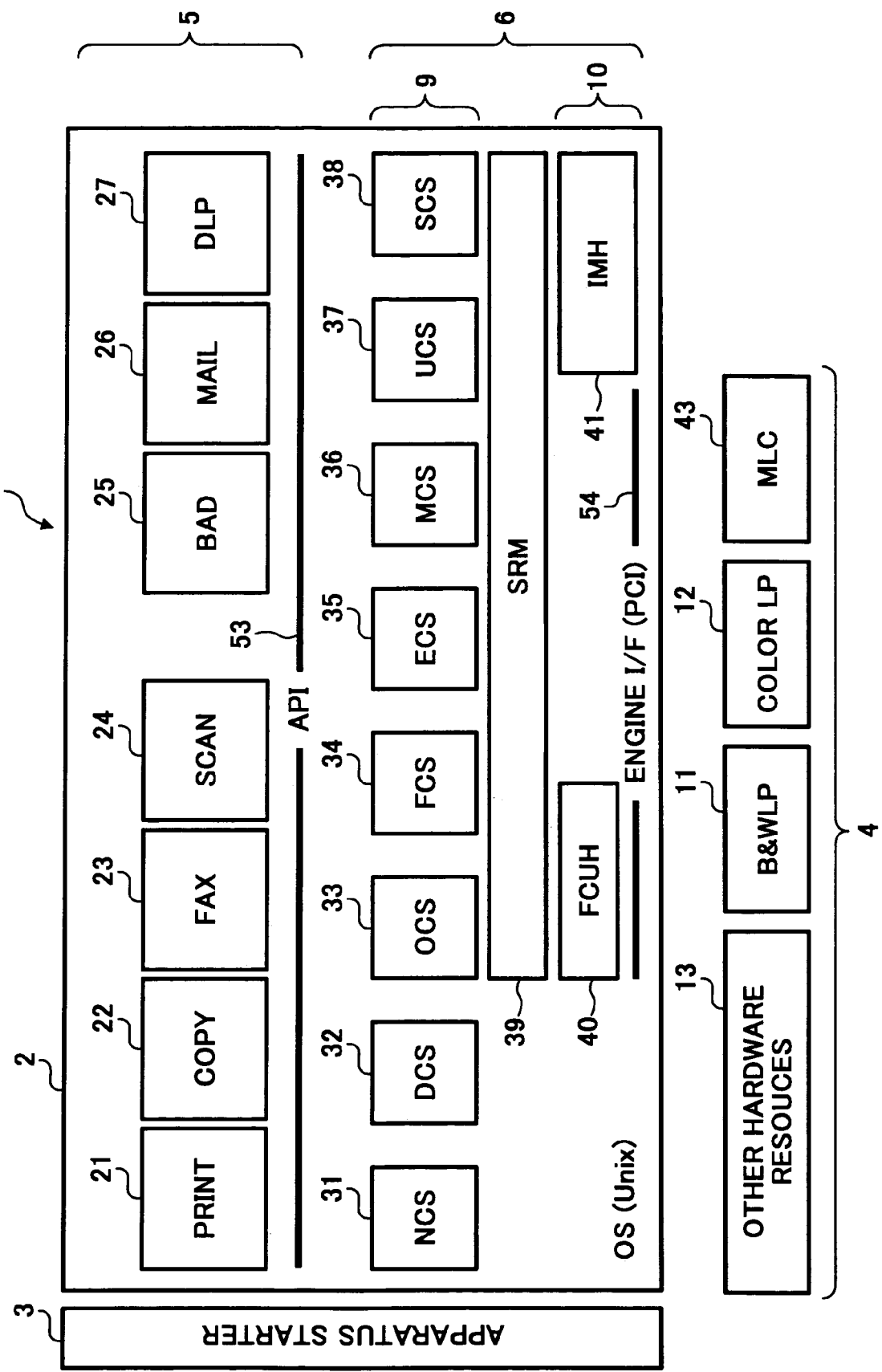
FIG. 6 is a block diagram of an image forming apparatus included in the banner advertisement system of FIG. 5.

Referring now to FIG. 6, an exemplary structure of the image forming apparatus 201 according to the preferred embodiment of the present invention is explained. As shown in FIG. 6, the image forming apparatus 201 includes a software section 2, an apparatus starter 3, and a hardware resource section 4. The software section 2 includes an application layer 5 and a platform layer 6 to be activated on an operating system (OS) such as UNIX, for example. The apparatus starter 3 is first activated to get the application layer 5 and the platform layer 6 started when the image forming apparatus. 201 is powered. For example, the apparatus starter 3 reads programs of the application layer 5 and the platform layer 6 from an external data storage (e.g., a hard disc drive apparatus), stores them into a memory area, and activates these programs. The hardware resource section 4 includes a black and white laser printer (B&W LP). 11, a color laser printer (color LP) 12, a media link controller (MLC) 43 for performing an image data conversion, and other hardware resources 13 including a scanner, a facsimile, and so on.

The application layer 5 of the software section 2 includes a first group of programs for executing processes specific to user services respectively related to image forming of printing, copying, facsimile, and scanning a printer application (explained later). The application layer 5 also includes a second group of programs for executing processes specific to user services respectively related to banner advertisement operations such as a display of banner advertisement, ordering of product or services in the banner advertisement, and inquiring of product or services in the banner advertisement.

The application layer 5 includes a printer application (PRINT) 21, a copying application (COPY) 22, a facsimile application (FAX) 23, a scanner application (SCAN) 24, a banner advertising application (BAD) 25, an e-mail application (MAIL) 26, and a download print application (DLP) 27.

The banner advertising application 25 performs various tasks including those for displaying a banner advertisement on the touch-sensing panel display during the time the image forming apparatus 201 is in a non-operative state, ordering or inquiring a banner advertisement displayed on the touch-sensing panel display, registering a banner advertisement, and so on. The e-mail application 26 performs a tack for transmitting information for ordering or inquiring a banner advertisement displayed on the touch-sensing panel display by e-mail, and receiving information in response to the inquiring by e-mail. The download print application 27 performs a task for downloading and printing information received in response to the inquiring sent by e-mail using the e-mail application 26.

The platform layer 6 includes a control service layer 9, a system resource manager (SRM) 39, and a handler layer 10. The control service layer 9 interprets a task request from the application layer 5 and generates a resource allocation request for acquiring a resource allocation from the hardware resource section 4. The system resource manager 39 manages the various kinds of resources included in the hardware resource section 4 and arbitrates the resource allocation request from the control service layer 9. The handler layer 10 manages the hardware resource section 4 in accordance with the resource allocation request from the SRM 39.

The control service layer 9 includes various service modules including a network control service (NCS) 31, a delivery control service (DCS) 32, an operation panel control service (OCS) 33, a facsimile control service (FCS) 34, an engine control service (ECS) 35, a memory control service (MCS) 36, a user information control service (UCS) 37, and a system control service (SCS) 38.

The platform layer 6 includes an application interface (API) 53 which is made capable of receiving a tack request from the application layer 5 in accordance with a predefined function. The operation system (OS) executes the software of the application layer 5 and the platform layer 6 as parallel processes.

The process of the NCS 31 provides services commonly available to the applications which require a network I/O (input and output), assigns data received with a suitable protocol from the network side to a corresponding one of the applications, and interfaces between the applications and the network to transmit data from the applications to the network side.

For example, the NCS 31 controls the data communications with network equipment connected thereto through the network with a HTTP (Hypertext Transfer Protocol) using a httpd (Hypertext Transfer Protocol Daemon).

The process of the DCS 32 controls distribution of accumulated documents. The process of the OCS 33 controls an operation panel (not shown) of the image forming apparatus 201 for interfacing the communications between an operator and the image forming apparatus 201. The process of the FCS 34 provides an API (application interface) for performing various operations including those of transmitting and receiving facsimile information through the application layer 5 using a PSTN (public switched telephone network) or an ISDN (integrated services digital network), registering and retrieving various kinds of facsimile data managed in a backup memory, reading facsimile, receiving and printing facsimile information, and so on.

The process of the ECS 35 controls various engines including the black and white laser printer 11, the color laser printer 12, and the hardware resources 13. The process of the MCS 36 performs memory control operations for acquiring a memory allocation and releasing an allocated memory portion, the use of a hard disk drive, and so on. The process of the UCS 37 performs a control of user information.

The process of the SCS 38 performs processing various operations including an application management, a control of the operation panel, a control of a system display, a control of an LED (liquid crystal display), a hardware resource management, a control of an application interruption, and so on.

The process of the SRM 39 performs the system control and the management of the hardware resource section 4 by cooperating with the SCS 38. For example, the process of the SRM 39 performs an arbitration in accordance with the resource acquiring request from an upper layer to use the black and white laser printer 11 or the color laser printer 12, for example, of the hardware resource section 4; and executes and controls the requested task using the requested hardware resource.

More specifically, the process of the SRM 39 determines whether the hardware resource of the hardware resource section 4 requested by the resource acquiring request is available, that is, whether the requested hardware resource is currently used by other resource acquiring request. Upon a determination that the requested hardware resource is available, the process of the SRM 39 notifies the requesting upper layer that the requested hardware resource is available. Further, the process of the SRM 39 prepares a schedule to use the requested resource in response to the resource acquiring request from the upper layer, and directly executes the requested task, e.g., transferring a sheet and forming an image using the printer engine, acquisition of a memory allocation, generating a file, etc.

The handler layer 10 includes a facsimile control unit handler (FCUH) 40 and an image memory handler (IMH) 41. The facsimile control unit handler 40 manages a facsimile control unit (FCU), explained later. The image memory handler 41 allocates memories to the processes and manages the memories allocated to the processes. The SRM 39 and the FCUH 40 requests a task to the hardware resource section 4 by using an engine I/F (interface) 54 which is made capable of transmitting a task request to the hardware resource section 4 by a predefined function. The IMH 41 generates an image conversion request for converting image data and the MLC 43 converts the image data in response to the image conversion request from the IMH 41.

The image forming apparatus 201 can perform the processes commonly required by the applications in a unified way on the platform layer 6.

Figure 7:
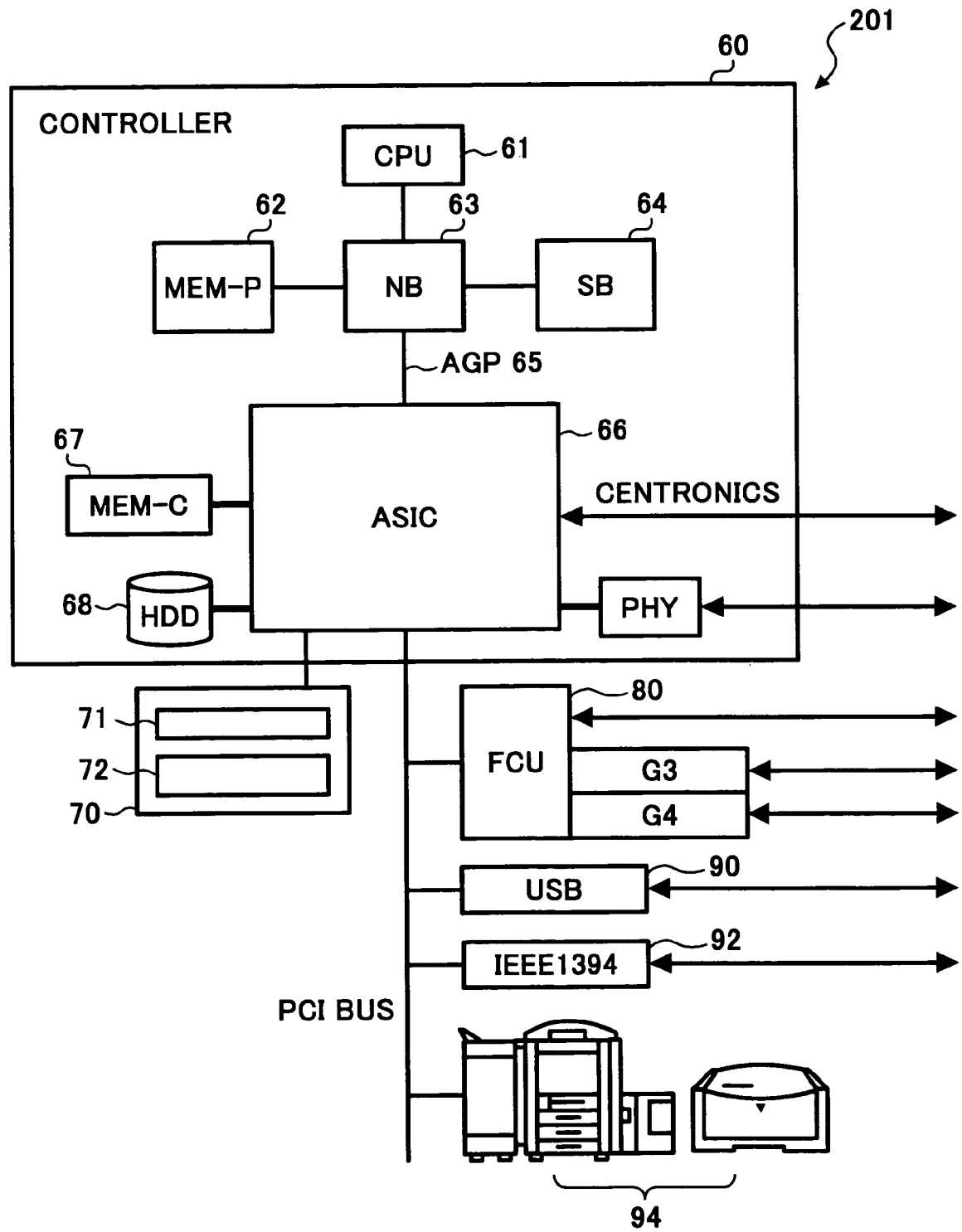
FIG. 7 is a block diagram of the image forming apparatus of FIG. 6.

Referring to FIG. 7, an exemplary hardware structure of the image forming apparatus 201 is explained. As shown in FIG. 7, the image forming apparatus 201 includes a controller 60, an operation panel 70, a facsimile control unit (FCU) 80, a universal serial bus (USB) 90, an IEEE-1394 (Institute of Electrical and Electronics Engineers 1394) device 92, and an engine 94.

The controller 60 includes a CPU (central processing unit) 61, a system memory (MEM-P) 62, a north bridge (NB) 63, a south bridge (SB) 64, an AGP (accelerated graphics port) 65, an ASIC (application-specific integrated circuit) 66, a local memory (MEM-C) 67, and a hard disk drive (HDD) 68.

The ASIC 66 of the controller 60 has a connection to connect to the operation panel 70 and a PCI (peripheral component interconnect) bus to connect to each of the FCU 80, the USB device 90, the IEEE-1394 device 92, and the engine 94.

In the controller 60, the local memory 67 and the HDD 68 are directly connected to the ASIC 66, and the CPU 61 is connected to the ASIC 66 via the NB 63 which is part of a CPU chip set. By thus providing the connection between the CPU 61 and the ASIC 66 via the NB 63, it becomes possible to handle a case where the interface of the CPU 61 is not disclosed.

It should be noted that the ASIC 66 and the NB 63 are connected to each other via the AGP 65 but not the PCI bus to prevent a performance reduction. That is, the AGP 65 is faster than the PCI bus which is too slow for the CPU 61 to perform a parallel execution of the plural processes forming the application layer 5 and the platform layer 6 and, for this purpose.

The CPU 61 controls the operations of the image forming apparatus 201, and brings the NCS. 31, the DCS 32, the OCS 33, the FCS 34, the ECS 35, the MCS 36, the UCS 37, the SCS 38, the SRM 39, the FCUH 40, and the IMH 41 to run and execute as the respective processes on the operation system (OS). Also, the CPU 61 brings to run and execute the printer application 21, the copying application 22, the facsimile application 23, the scanner application 24, the advertising application 25, the e-mail application 26, and the download print application 27, which form the application layer 5.

In the discussion below, the image forming apparatus 201 is assumed to execute the processes of the advertising application 25, the e-mail application 26, and the download print application 27 although these processes are primarily performed by the respective applications.

The NB 63 serves as a bridge for connecting the CPU 61, the system memory 62, the SB 64, and the ASIC 66 to each other. The system memory 62 serves as an image rendering memory for the image forming apparatus 201 to render an image. The SB 64 serves as a bridge for connecting the NB 63 to a ROM (read only memory), not shown, a PCI bus, and peripheral devices. The local memory 67 serves as a copying image buffer and a code buffer.

The ASIC 66 is an integrated circuit (IC) specifically designed for image processing involving image processing hardware elements. The HDD 68 is a relatively large capacity storage for storing image data, document data, programs, font data, and forms. The operation panel 70 includes a key bad 71 for entering user input operations and a touch-sensing panel display 72 for indicating user guidance and various kinds of banner advertisements. The touch-sensing panel display 72 can be substituted for by a different display such as a CRT (cathode ray tube) display, an LCD (liquid crystal display), an ELD (lectroluminescent display), a PDP (plasma display panel), and so forth.

Figure 8:
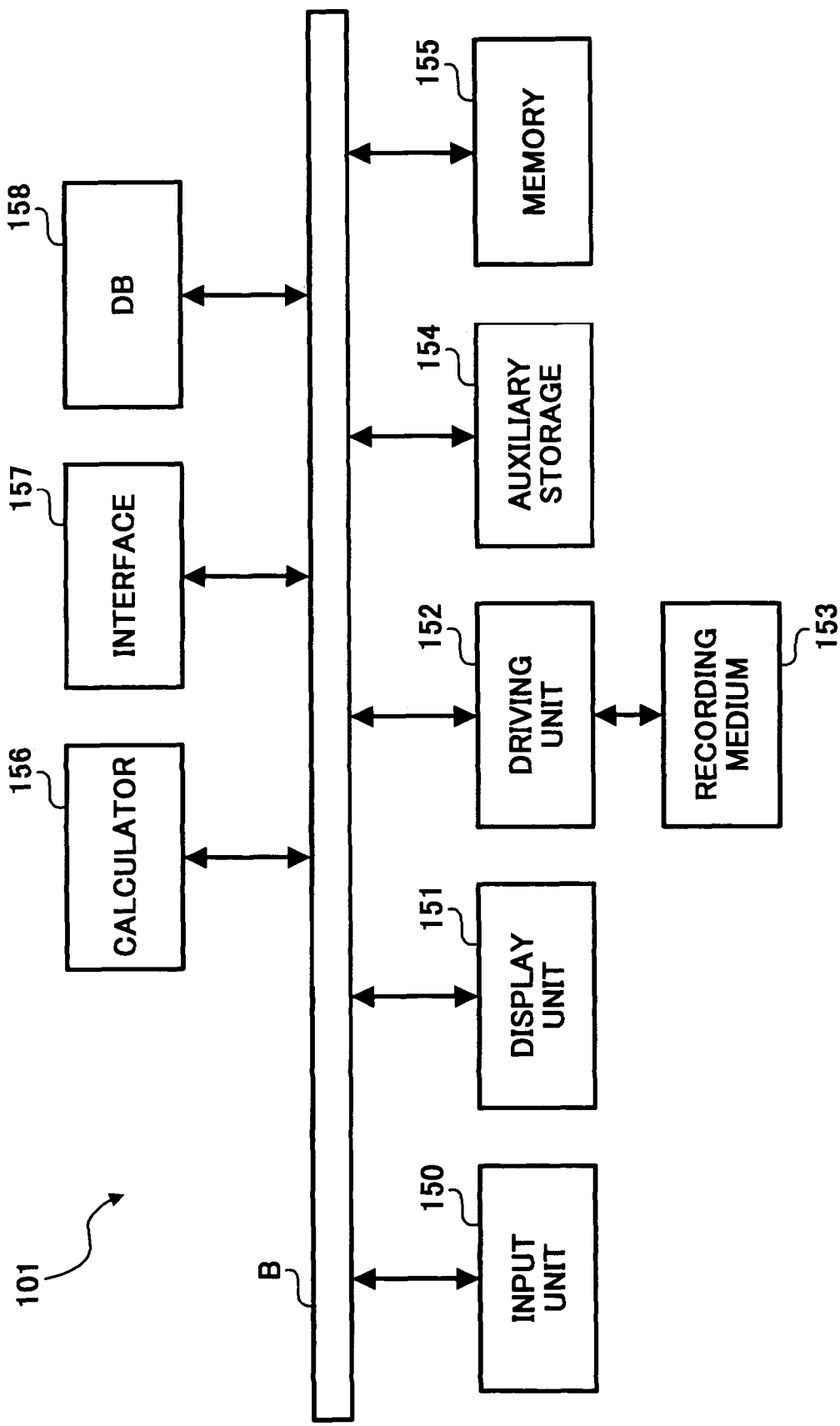
FIG. 8 is a block diagram of a banner advertisement server according to an exemplary embodiment of the present invention.

Referring to FIG. 8, an exemplary hardware structure of the banner advertisement server 101 is explained. As shown in FIG. 8, the banner advertisement server 101 includes a data entry unit 150, a display unit 151, a recording medium drive unit 152, an auxiliary data storage unit 154, a main memory unit 155, a central processing unit (CPU) 156, a communications interface unit 157, a data base 158, and an internal bus 159. The data entry unit 150 includes various data input components including, for example, a keyboard and a mouse which are not shown for the user of the banner advertisement server 101 to enter various operational signals into the CPU 156. The display unit 151 includes a display (not shown) for the user of the banner advertisement server 101 to have visual information thereon. The communications interface unit 157 interfaces the CPU 156 with the network. The internal bus 159 connects all these components to each other, such as the data entry unit 150, the display unit 151, the recording medium drive unit 152 etc.

Programs for the banner advertisement server 101 are provided to the CPU 156 from a recording medium 153, e.g., a CD-ROM (compact disc read only memory), or through downloading from the network. That is, for example, the recording medium 153 is set in the recording medium drive unit 152 and various kinds of data and programs for the banner advertisement server 101 are installed in the auxiliary data storage unit 154 from the recording medium 153 via the recording medium drive unit 152.

The auxiliary data storage unit 154 stores various kinds of data and the programs for the banner advertisement server 101 as well as necessary data files. The main memory unit 155 reads and stores the banner-advertisement server programs from the auxiliary data storage unit 154 when the CPU 156 is powered. The CPU 156 executes processing in accordance with the banner-advertisement server programs read and stored by the main memory unit 155.

The data base 158 various kinds of data bases such as the banner advertiser data base 111, the client data base 112, the apparatus data base (APDB) 113, the distributive banner-advertisement content data base (DCDB) 114, etc., which are provided to the maintenance company 100, as shown in FIG. 5.

Figure 9:
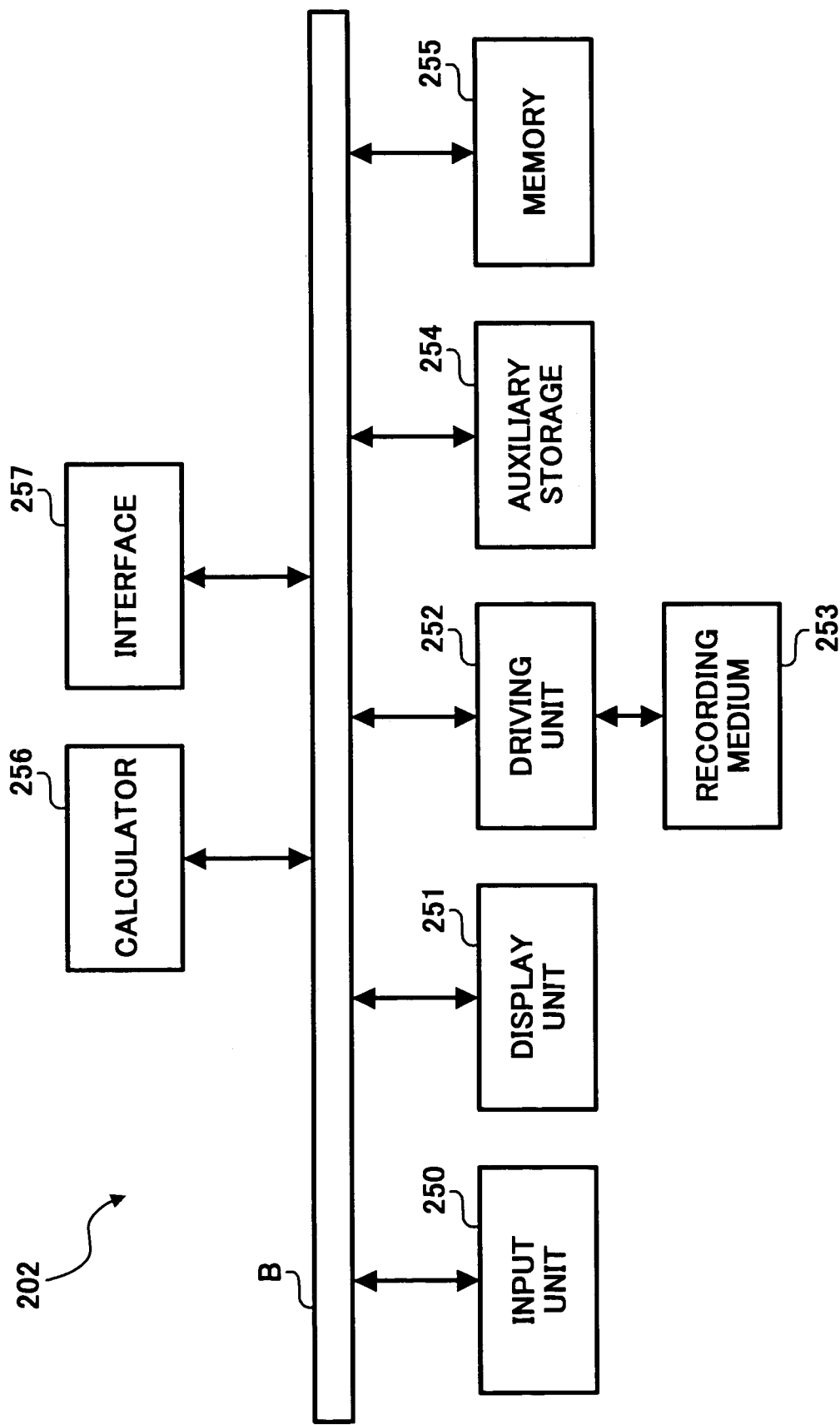
FIG. 9 is a block diagram of a client terminal connected to the image forming apparatus of FIG. 6.

Referring to FIG. 9, an exemplary hardware structure of the user terminal 202 is explained. As shown in FIG. 9, the user terminal 202 includes a data entry unit 250, a display unit 251, a recording medium drive unit 252, an auxiliary data storage unit 254, a main memory unit 255, a central processing unit (CPU) 256, an interface unit 257, and an internal bus 259. The data entry unit 250 includes various data input components including, for example, a keyboard and a mouse which are not shown for the user of the user terminal 202 to enter various operational signals into the CPU 256. The display unit 251 includes a display (not shown) for the user of the user terminal 202 to have visual information thereon. The interface unit 257 interfaces the CPU 256 with the network. The internal bus 259 connects all these components to each other, such as the data entry unit 250, the display unit 251, the recording medium drive unit 252, etc.

Programs for the user terminal 202 are provided to the CPU 256 from a recording medium 253, e.g., a CD-ROM (compact disc read only memory), or through downloading from the network. That is, for example, the recording medium 253 is set in the recording medium drive unit 252 and various kinds of data and programs for the user terminal 202 are installed in the auxiliary data storage unit 254 from the recording medium 253 via the recording medium drive unit 252.

The auxiliary data storage unit 254 stores various kinds of data and the programs for the user terminal 202 as well as necessary data files. The main memory unit 255 reads and stores the banner-advertisement server programs from the auxiliary data storage unit 254 when the CPU 256 is powered. The CPU 156 executes processing in accordance with the banner-advertisement server programs read and stored by the main memory unit 255.

The data bases of the maintenance company 100, shown in FIG. 5, are now explained. These data bases can be created by using an ordinary file format or with a relational data base. In the discussion below, it is assumed that the data bases are exemplarily created based on a relational data base.

Referring to FIG. 10, one example of the banner advertiser data base (BADB) 111 which is connected to the banner advertisement server 101 is explained. The BADB 111 stores various kinds of information related to banner advertisers as information items A1, A2, A3, A4, and A5, in which the information item A1 represents an identification of a banner advertiser, the information item A2 a name of the banner advertiser, the information item A3 a contact of the banner advertiser, the information item A4 a payment method for banner advertisement by the banner advertiser, and the information item A5 a payment method for services by the banner advertiser. The banner advertiser identification as the information item A1 is uniquely assigned to the banner advertiser by the banner advertisement server 101. Other information items A2-A5, which as a whole are referred to as banner advertiser information, are collected from the banner advertiser terminal 301 and/or the image forming apparatus 201 through the Internet 90. In the discussion below, however, the registration of banner advertisement is assumed to be conducted simply by the banner advertiser terminal 301, for the sake of clarity.

The contact of the banner advertiser as the information item A3 may not be limited to one contact but can include a plurality of contacts. The payment method for banner advertisement as the information item A4 includes information of one of a contract bank transfer from a deposit bank account of the banner advertiser, a mail transfer upon receiving a bill for banner advertisement, and so on as well as other necessary information including a deposit bank account of the banner advertiser, an address to which a bill for banner advertisement is sent. Likewise, the payment method for services as the information item A5 includes information of one of a contract bank transfer from a deposit bank account of the banner advertiser, a mail transfer upon receiving a bill for services, a cash payment, and so on as well as other necessary information including a deposit bank account of the banner advertiser, an address to which a bill for services is sent.

For example, in FIG. 10, one exemplary banner advertiser given the banner advertiser identification of 148858 registers the name of ABC company, Ltd., the contact of abc@abc.co.jp, and the payment method for the banner advertisement fees and services with a contract bank transfer using its own deposit bank account.

In addition to the banner advertiser information transferred from the banner advertiser terminal 301, the banner advertisement server 101 further receives information related to the banner advertisement from the banner advertiser terminal 301, including a field of the banner advertisement, a time period of the banner advertisement, a headline of the banner advertisement, and contents of the banner advertisement, which as a whole are referred to as registered banner-advertisement content information. Upon receiving the registered banner-advertisement content information, the banner advertisement server 101 stores them in the distributive banner-advertisement content data base (DCDB) 114.

Referring to FIG. 11, one example of the distributive banner-advertisement content data base (DCDB) 114 connected to the banner advertisement server 101 is explained. As shown in FIG. 11, the DCDB 114 stores the banner advertiser identification as a key information term, stored in the column of the information item A1 of the banner advertiser data base 111, and various kinds of information linked to the key information term (i.e., the banner advertiser identification) in association with contents of the banner-advertisement as information items B1, B2, B3, B4, and B5. The information item B1 represents an identification of a registered banner advertisement, the information item B2 a field of the registered banner advertisement, the information item B3 a time period of the registered banner advertisement, the information item B4 a headline of the registered banner advertisement, and the information item B5 contents of the registered banner advertisement. The distributive banner-advertisement content data base (DCDB) 114 maintains a relationship with the banner advertiser data base (BADB) 111 based on the key information term of the banner advertiser identifications in the column of the information item A1.

In FIG. 11, the banner advertisement identification as the information item B1 is an identifier uniquely assigned to a banner advertisement by the banner advertisement server 101 for identifying the banner advertisement. The banner advertisement field as the information item B2 specifies a field to which the banner advertisement belongs. An exemplary banner advertisement field is one of architecture, machines, electrical and electronic products, computers, communications, energies, etc. as well as non-genre.

The banner advertisement period as the information item B3 is a time period specified by the banner advertiser 300 or the maintenance company 100. The headline as the information item B4 is expressed by a phrase, a motion image, etc., representing the contents of the banner advertisement. The banner advertisement contents as the information item B5 are the contents of the banner advertisement and include image data or voice data to be displayed on a contracted apparatus such as the image forming apparatus 201, for example.

For example, according to the distributive banner-advertisement content data base 114, the banner advertiser having the banner advertiser identification of 148858 registers the banner advertisement having the banner advertisement identification of 214587 in the banner advertisement field of 10, available from 8:30 AM to 10:30 PM during the time period from Apr. 1, 2001 to Apr. 30, 2001, with the headline of "World First - - - ," and with the banner advertisement contents data DATA1.

In addition to the above-mentioned registered banner-advertisement content information as the information items B1-B5, other kinds of additional information such as news, for example, may be stored in the distributive banner advertisement data base (DCDB) 114. The maintenance company 100 by itself generates data of banner advertisement and the above-mentioned additional information such as news and stores them into appropriate data bases. In this operation, an unnecessary information item can be processed as a blanked column.

In the discussion below, it is assumed that one banner advertisement offers one kind of services, for the sake of simplicity.

Referring to FIG. 12, one example of the client data base (CTDB) 112 connected to the banner advertisement server 101 is explained. As shown in FIG. 12, the CTDB 112 stores various kinds of information related to clients in columns of information items C1, C2, C3, and C4, in which the information item C1 represents an identification of a client, the information item C2 a name of the client, the information item C3 a contact of the client, and the information item C4 a payment method for a use of services by the client. The client identification as the information item C1 is an identifier uniquely assigned to a client such as the machine user 200, for example, by the banner advertisement server 101. The information of the information items C2, C3, and C4 which as a whole are referred to as client information are sent from the image forming apparatus 201 by the machine user 200 via the Internet 90.

The client contact as the information item C3 may not be limited to one contact but can include a plurality of contacts. The payment method for the use of services as the information item C4 includes one of a contract bank transfer from a deposit bank account of the client, a mail transfer upon receiving a bill for the use of services, a cash payment, and so on as well as other necessary information including a deposit bank account of the client, an address to which a bill for the use of services is sent.

For example, according to the client data base (CTDB) 112, the client having the client identification of 423049 registers the name of XYZ company, the contact of xyz@xyz.co.jp, and the payment method of a contract bank transfer at a deposit bank account of the client.

In addition to the above-mentioned client information as the information items C2, C3, and C4, the banner advertisement server 101 further receives, from the image forming apparatus 201, machine information including an identification of a machine (e.g., the image forming apparatus 201), an address of the machine, a desired news genre to be displayed on the machine, and a desired banner advertisement field to be displayed on the machine, and stores these kinds of information into the apparatus data base (APDB) 113.

Referring to FIG. 13, one example of the apparatus data base (APDB) 113 connected to the banner advertisement server 101 is explained. As shown in FIG. 13, the APDB 113 stores the client identification as a key information term, stored as the information item C1 of the client data base (CTDB) 112, and the above-mentioned machine information linked to the key information term (i.e., the client identification) in association with the machine information as information items D1, D2, D3, and D4. The information item D1 represents an identification of a machine, the information item D2 an address of the machine, the information item D3 a desired news genre, and the information item D4 a desired banner advertisement field. The apparatus data base (APDB) 113 maintains a relationship with the client data base 112 based on the key information term (i.e., the client identification) in the column of the information item C1.

In the apparatus data base (APDB) 113, the machine identification as the information item D1 is based on an original manufacturing number, for example, which is uniquely assigned to each machine by a machine manufacture. The machine address as the information item D2 is an address used for the communications between the banner advertisement server 101 and the image forming apparatus 201. For example, the machine address is based on an IP (Internet protocol) address when the machine has such address for a connection to the Internet 90 or a telephone number when the machine uses the PSTN to connect to the Internet 90.

The desired news genre as the information item D3 and the desired banner advertisement as the information item D4 are those kinds of information specifying genre or field of news to be distributed from the banner advertisement server 101 to the image forming apparatus 201.

Referring to FIG. 14, one example of the banner advertisement content data base (ACDB) 211 which is connected to the image forming apparatus 201 is explained. As shown in FIG. 14, the ACDB 211 stores the banner advertisement identification, the banner advertisement period, the headline of the banner advertisement, and the contents of the banner advertisement, which are stored as the information items B1, B3, B4, and B5, respectively, in the distributive banner-advertisement content data base 114 connected to the banner advertisement server 101. The banner advertisement content data base 211 further stores the banner advertiser identification and the contact of the banner advertiser, which are stored as the information items A1 and A3 in the banner advertisement data base 111 connected to the banner advertisement server 101. These kinds of the information in the information items B1, B3, B4, B5, A1, and A3 of the ACDB 211 are referred to as transmitted banner advertisement content information. Further, the banner advertisement content data base 211 stores information representing banner advertisement display data as an information item E1.

That is, the banner advertisement content information as the information items B1, B3, B4, B5, A1, and A3 are transferred from the banner advertisement server 101 to the image forming apparatus 201 and are stored as one record into the banner advertisement content data base (ACDB) 211.

The image forming apparatus 201 stores the banner advertisement display data as the information item E1 in association with a corresponding record of the transmitted banner-advertisement content information stored in the columns of the information items B1, B3, B4, B5, A1, and A3. The image forming apparatus 201 increments by one the banner advertisement display data as the information item E1 each time the image forming apparatus 201 executes on the touch-sensing panel display 72 a particular banner advertisement specified by a banner advertisement identification stored as the information item B1.

As an alternative to the banner advertisement display data as the information item E1, which are respectively associated with corresponding records of the transmitted banner advertisement content data, a consolidated banner advertisement display data can be used. In this case, the image forming apparatus 201 increments the consolidated banner advertisement display data by one when it executes any one of banner advertisements.

Further, the image forming apparatus 201 is capable of switching a display mode of banner advertisement between a active-display mode and an inactive-display mode. When the display mode is set to the active-display mode by the machine user 200, the image forming apparatus 201 displays the headlines or full contents of the respective banner advertisements on the touch-sensing panel display 72, at random or with referring to the registered time periods of the respective banner advertisements.

Figure 15:
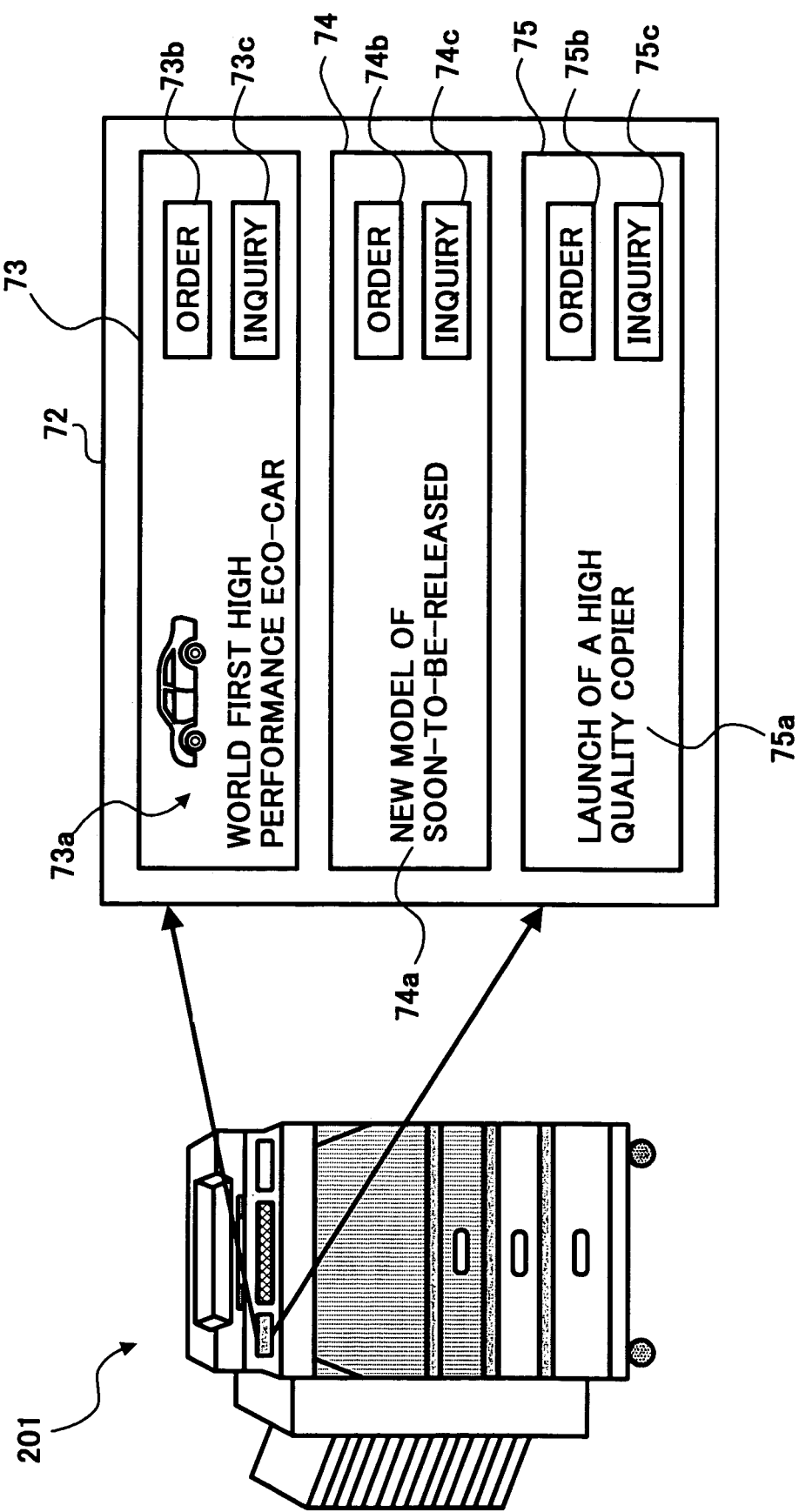
FIG. 15 is an illustration for explaining a display of banner advertisements on a touch-sensing panel display of the image forming apparatus of FIG. 6.

Referring to FIG. 15, an example of banner advertisement displayed on the touch-sensing panel display 72 of the image forming apparatus 201 is explained. The image forming apparatus 201 is given permission for the display of image by the machine user 200 and, when the image forming apparatus 201 is not operated by the machine user 200, it displays on the touch-sensing panel display 72 the banner advertisement distributed by the banner advertisement server 101.

When the image forming apparatus 201 displays the banner advertisement on the touch-sensing panel display 72, it increments by one a value of the banner advertisement display data corresponding to the banner advertisement identification of the displayed banner advertisement in the banner advertisement content data base (ACDB) 211.

As illustrated in FIG. 15, the image forming apparatus 201 displays banner advertisements 73-75, for example, on the touch-sensing panel display 72. Each of the banner advertisements 73-75 includes an advertisement, an ordering button, and an inquiry button. For example, the banner advertisement 73 includes an advertisement 73a, an ordering button 73b, and an inquiry button 73c. The advertisement 73a includes characters, and it may further include various other kinds of information including a motion picture and voice information, for example.

When the machine user 200 is interested in the banner advertisement 73, for example, displayed on the touch-sensing panel display 72, the machine user 200 can select one of the ordering button 73b and the inquiring button 73c to press so as to perform ordering or inquiring the item of the banner advertisement. The image forming apparatus 201 obtains the contact information of the banner advertiser 300 from the banner advertisement content data base 211 based on the banner advertisement identification corresponding to the button pressed by the machine user 200.

The image forming apparatus 201 executes the ordering or the inquiring about the selected banner advertisement to the banner advertiser 300 by sending e-mail, for example, based on the obtained contact information of the banner advertiser 300. Upon the execution of ordering the services of the banner advertisement, the image forming apparatus 201 stores the identification of the ordered banner advertisement into a column associated with the banner advertisement identification in the service order data base (SODB) 213 and increments by one a value of an item associated with the ordering data corresponding to the identification of the ordered banner advertisements in the SODB 213.

In this way, the machine user 200 can place an order or an inquiry for a banner advertisement displayed on the touch-sensing panel display 72 to the banner advertiser 300 by using the image forming apparatus 201.

Figures 16, 17:
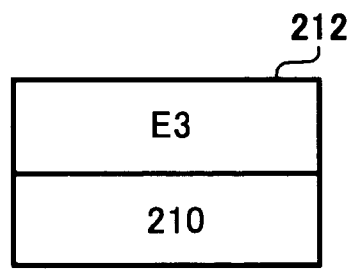
FIG. 16 is a data table of a service ordering data base connected to the image forming apparatus of FIG. 6.
FIG. 17 is a data table of a counter data base connected to the image forming apparatus of FIG. 6.

FIG. 16 shows exemplary contents of the service order data base (SODB) 213 connected to the image forming apparatus 201 of the machine user 200. As shown in FIG. 16, the service order data base 213 stores the banner advertisement identification (i.e., the information item B1) and ordering data as an information item E2. Upon a storage of the banner advertisement identification as the information item B1 into the ACDB 211, as shown in FIG. 14, the same banner advertisement identification is stored also in the SODB 213.

When the machine user 200 performs through the image forming apparatus 201 an ordering of the services based on the banner advertisement displayed on the touch-sensing panel display 72 and which has the banner advertisement identification of 214587, for example, the image forming apparatus 201 increments a value, 40, of the ordering data (i.e., the information item E2) by one to 41 stored in the same record as the banner advertisement having the banner advertisement identification 214587 in the service order data base 213, as shown in FIG. 16.

FIG. 17 shows one example of the counter data base (CTDB) 212 connected to the image forming apparatus 201 of the machine user 200. As shown in FIG. 17, the CTDB 212 stores counter data as an information item E3. Upon an execution of the image forming operation, the image forming apparatus 201 increments the counter data by one. For example, FIG. 17 indicates that the image forming apparatus 201 has performed 210 times of the image forming operations.

Figure 18:
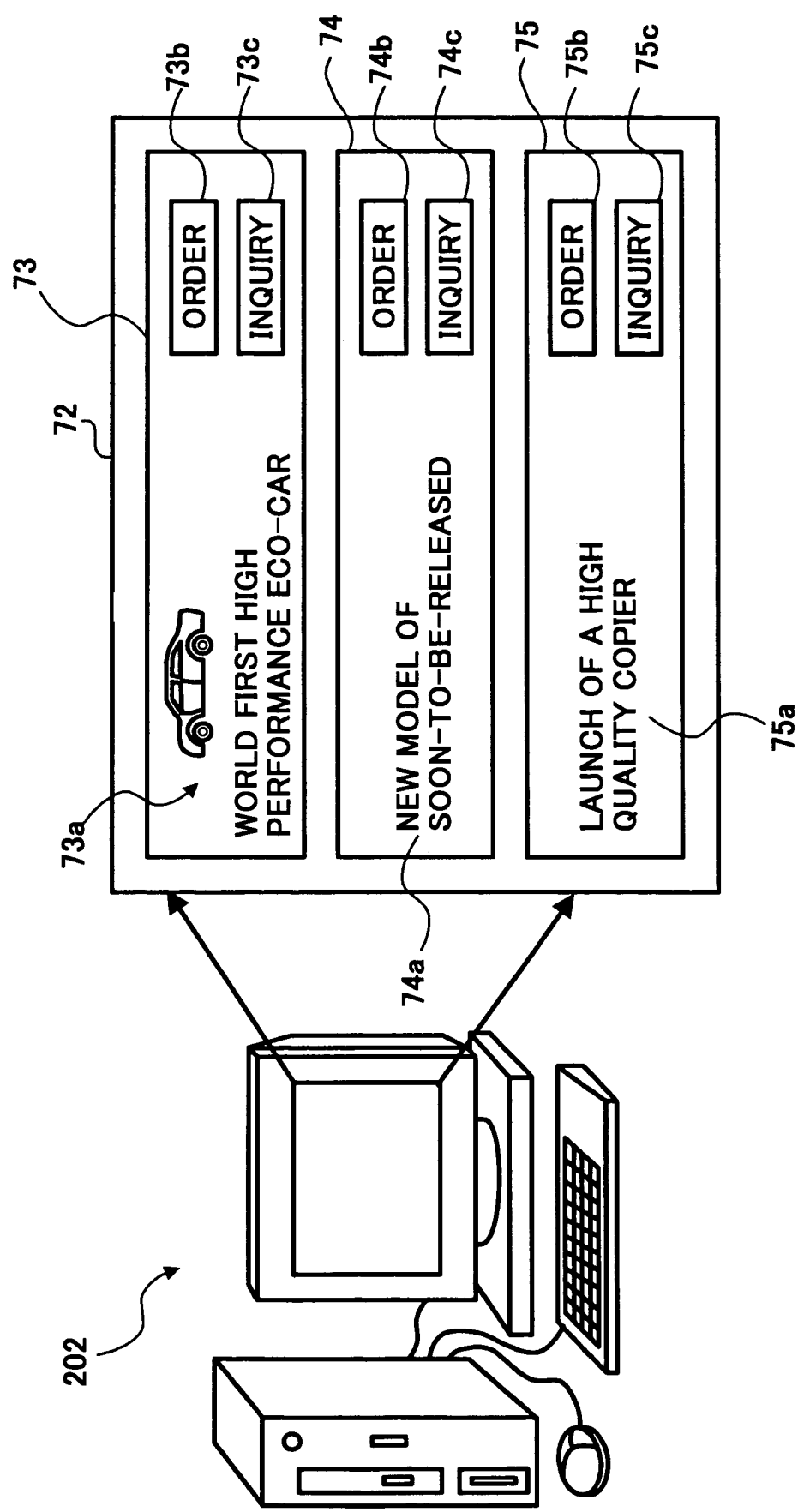
FIG. 18 is an illustration for explaining a display of banner advertisements on a display of the user terminal of FIG. 9.

Referring to FIG. 18, one example of a display of the banner advertisement on the user terminal 202 is explained, in which the banner advertisement is the one distributed to the image forming apparatus 201 and is transferred to the user terminal 202. By accessing the image forming apparatus 201, the user terminal 202 can display the banner advertisement content information distributed to the image forming apparatus 201 during the time the image forming apparatus 201 is in a non-operative state.

The user terminal 202 transmits the data associated with the banner advertisement identification of the banner advertisement displayed on the user terminal 202 to the image forming apparatus 201. Upon a receipt of the data associated with the banner advertisement identification from the user terminal 202, the image forming apparatus 201 increments by one the banner advertisement display data as the information item E1 in the banner advertisement content information data base 211.

In the discussion below, it is assumed that the banner advertisement is displayed simply on the image forming apparatus 201 but not on the user terminal 202, for the sake of simplicity.

Figure 19:
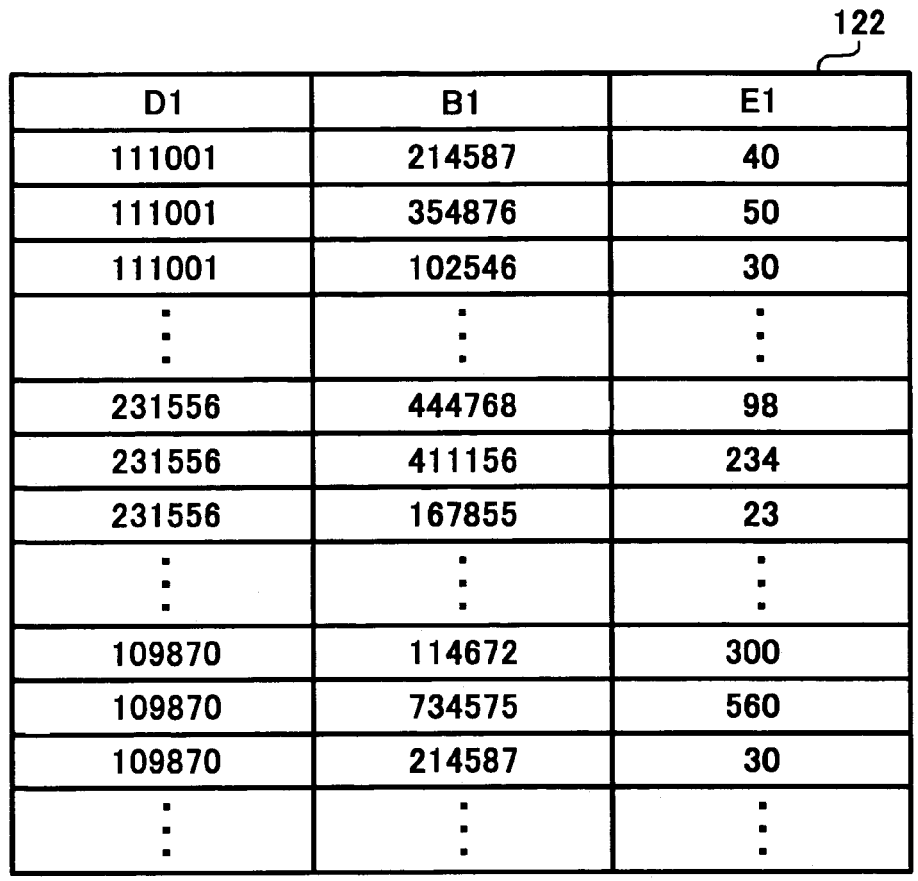
FIG. 19 is a data table of a banner advertisement display consolidation data base connected to the banner advertisement server of FIG. 8.

Referring to FIG. 19, an example of the banner-advertisement display consolidation data base (DCDB) 122 connected to the banner advertisement server 101 of the maintenance company 100 is explained. The DCDB 122 stores the machine identification (i.e., the information item D1), the banner advertisement identification (i.e., the information item B1), and the banner advertisement display data (i.e., the information item E1). The banner advertisement server 101 collects the banner advertisement identifications (i.e., the information item B1) and the banner advertisement display data (i.e., the information item E1) from the same record in the banner advertisement content data base 211 through the image forming apparatus 201, as information associated with the machine identification (i.e., the information item D1). The banner advertisement server 101 consolidates the collected data with the machine identification (i.e., the information item D1) stored in the apparatus data base (APDB) 113, and stores these kinds of information as the respective information items D1, B1, and E1 into the banner-advertisement display consolidation data base (DCDB) 122, as shown in FIG. 19. The data collection through the image forming apparatus 201 can be performed at irregular intervals or at predetermined time intervals such as once every day, once every week, or once every month, for example. As an alternative to the collection operation performed by the banner advertisement server 101, the image forming apparatus 201 may be configured: to automatically transmit the data at irregular intervals or at predetermined intervals to the banner advertisement server 101.

Figure 20:
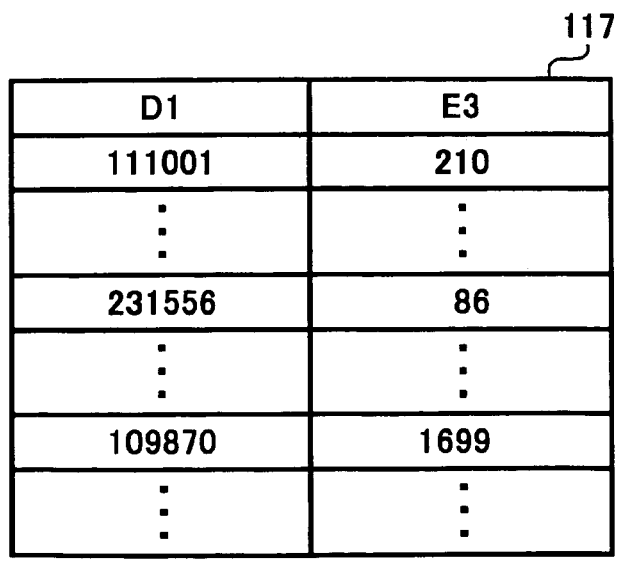
FIG. 20 is a data table of a counter consolidation data base connected to the banner advertisement server of FIG. 8.

Referring to FIG. 20, an example of the counter data consolidation data base (CCDB) 117 connected to the banner advertisement server 101 of the maintenance company 100 is explained. The CCDB 117 stores the machine identification (i.e., the information item D1) and the counter data (i.e., the information item E3), as shown in FIG. 20. The banner advertisement server 101 collects the counter data (i.e., the information item E3) from the counter data base (CTDB) 212 through the image forming apparatus 201, as information associated with the machine identification (i.e., the information item D1). The banner advertisement server 101 consolidates the collected information with the machine identification (i.e., the information item D1) stored in the apparatus data base (APDB) 113 into the counter data consolidation data base (CCDB) 117 as the respective information items D1 and E3, as shown in FIG. 20.

Referring to FIG. 21, an example of the service ordering consolidation data base (OCDB) 116 connected to the banner advertisement server 101 of the maintenance company 100 is explained. As shown in FIG. 21, the OCDB 116 stores the machine identification (i.e., the information item D1), the banner advertisement identification (i.e., the information item B1), the ordering data (i.e., the information item E2), and information as an information item E4 representing points. The banner advertisement server 101 collects the banner advertisement identification (i.e., the information item B1) and the ordering data (i.e., the information item E2) from the same record of the service order data base (SODB) 213 through the image forming apparatus 201, as information associated with the machine identification (i.e., the information item D1). The banner advertisement server 101 stores the collected information as the respective information items B1 and E2 into the same record of the service ordering consolidation data base (OCDB) 116. The banner advertisement server 101 converts the value of the collected ordering data into points, and stores the points as the information item E4 in the same record, as the collected information-items B1 and E2 are stored.

The banner-advertisement display consolidation data base (DCDB) 122, the counter data consolidation data base (CCDB) 117, and the service ordering consolidation data base (OCDB) 116 maintain a mutual relationship based on the key information term of the machine identification (i.e., the information item D1).

Referring to FIG. 22, an example of the banner-advertisement fee data base (AFDB) 118 connected to the baser advertisement server 101 of the maintenance company 100 is explained. The AFDB 118 stores the banner advertiser identification (i.e., the information item A1), the banner advertisement identification (i.e., the information item B1), and a banner advertisement fee as an information item E5.

The banner advertisement server 101 calculates the banner advertisement fee for each of the banner advertisements having the respective banner advertisement identifications based on the banner advertisement display data stored in the banner-advertisement display consolidation data base (DCDB) 122 as the information item E1, shown in FIG. 19, and stores the calculated banner advertisement fee into the banner-advertisement fee data base 118 as the information item E5, as shown in FIG. 22.

When the banner advertiser identification and the registered banner-advertisement content information including the banner advertisement identification, the banner advertisement field, the banner advertisement period, the headline, and the banner advertisement contents are stored into the distributive banner-advertisement content data base (DCDB) 114, the same banner advertiser identification and the banner advertisement identification are stored as the information items A1 and B1, respectively, into the banner advertisement fee data base (AFDB) 118.

The banner advertisement server 101 refers to the banner advertisement identifications stored in the banner advertisement fee data base (AFDB) 118, specifies the banner advertisement display data corresponding to each one of the banner advertisements stored in the banner-advertisement display consolidation data base (DCDB) 122, and calculates banner advertisement fees for the respective banner advertisement identifications based on the banner advertisement display data.

The above-mentioned calculation of the banner advertisement fee can be executed at irregular intervals or at predetermined intervals such as once every day, once every week, once every month, etc.

The banner advertisement server 101 verifies the payment method for the banner advertisement registered by the banner advertiser through the banner advertiser data base (BADB) 111. For example, when the payment method by the banner advertiser is the contract bank transfer using a bank account for the banner advertiser, the calculated fee for the banner advertisement is automatically transferred from the obtained bank account to a bank account belongs to the maintenance company 100.

Referring to FIG. 23, an example of the maintenance fee data base (MFDB) 119 connected to the banner advertisement server 101 of the maintenance company 100 is explained. The MFBB 119 stores the client identifications (i.e., the information item C1), the machine identifications (i.e., the information item D1), and maintenance fees as an information item E6.

When the client identification (i.e., the information item C1) and the machine information (i.e., the information item D1) are stored into the apparatus data base (APDB) 113, the same client identification and the machine identification are stored as the information items C1 and D1, respectively, in the maintenance fee data base (MFDB) 119.

The banner advertisement server 101 calculates basic maintenance fees for the respective machine identifications based on the information stored in the banner-advertisement display consolidation data base (DCDB) 122, the counter data consolidation data base (CCDB) 117, and the service ordering consolidation data base (OCDB) 116. The banner advertisement server 101 stores the calculated basic maintenance fees as the information item E6 into the maintenance fee data base (MFDB) 119.

The banner advertisement server 101 refers to the machine identifications stored in the maintenance fee data base (MFDB) 119, specifies the counter data corresponding to the machine identifications in the counter data consolidation data base (CCDB) 117, and calculates the basic maintenance fees for the respective machines identified by the machine identifications in accordance with the specified counter data.

Further, the banner advertisement server 101 refers to the machine identifications stored in the maintenance fee data base (MFDB) 119, specifies the displayed banner advertisement data corresponding to the respective machine identifications in the banner-advertisement display data consolidation data base (DCDB) 122, and calculates discount amounts for the respective basic maintenance fees of the banner advertisements having the machine identifications in accordance with the specified banner-advertisement display data.

Further, the banner advertisement server. 101 refers to the machine identifications stored in the maintenance fee data base 119, specifies the point data corresponding to the respective machine identifications in the service ordering consolidation data base (OCDB) 116, and calculates discount amounts for the basic maintenance fees of the respective machine identifications in accordance with the specified point data.

The banner advertisement server 101 subtracts the discount amounts calculated based on the specified banner-advertisement display data and the specified point data from the respective calculated basic maintenance fees, and stores the resultant maintenance fees into the maintenance fee data base (MFDB) 119.

The above-mentioned calculations of the basic maintenance fees and the discount amounts can be executed at irregular intervals or at predetermined intervals such as once every day, once every week, once every month, etc.

The banner advertisement server 101 verifies the payment method registered by each client through the client data base (CTDB) 112. For example, when the payment by the client is the contract bank transfer using the client bank account, the calculated fee is automatically transferred from the client bank account to a bank account of the maintenance company 100.

Referring to FIG. 24, an example of the service provision consolidation data base (PCDB) 120 connected to the banner advertisement server 101 of the maintenance company 100 is explained. The PCDB 120 stores the machine identifications (i.e., the information item D1), the banner advertisement identifications (i.e., the information item B1), and delivered service data as an information item E7. When the machine identification and the banner advertisement identification are stored into the service ordering consolidation data base (OCDB) 116, the same information are stored as the information items D1 and B1, respectively, in the service provision consolidation data base (PCDB) 120.

Figure 25:
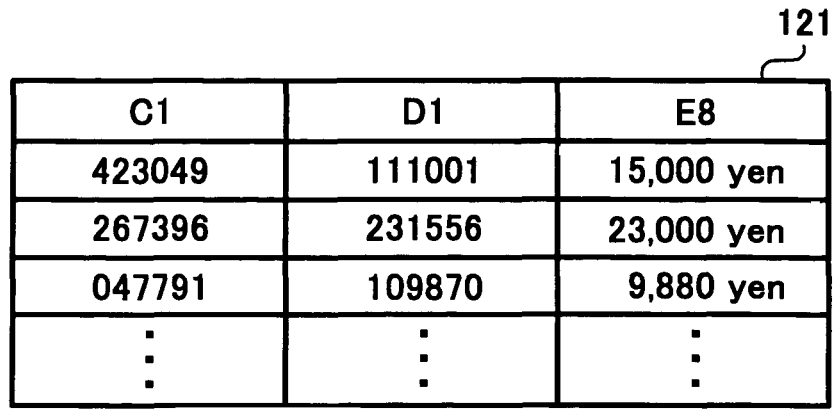
FIG. 25 is a data table of a service fee data base connected to the banner advertisement server of FIG. 8.

Referring to FIG. 25, an example of the service fee data base (SFDB) 121 connected to the banner advertisement server 101 of the maintenance company 100 is explained. The SFDB 121 stores the client identifications (i.e., the information item C1), the machine identifications (i.e., the information item D1), and service use fees as an information item E8.

When the client identification (i.e., the information item C1) and the machine identification (i.e., the information item D1) are stored into the apparatus data base (APDB) 113, as shown in FIG. 13, the same client identification and the machine identification are stored as the information items C1 and D1, respectively, in the service fee data base (SFDB) 121.

The banner advertisement server 101 refers to the machine identifications to specify the delivered service data (i.e., the information item E7) in the service provision consolidation data base (PCDB) 120, and calculates the basic service use fees for the respective machines, identified by the machine identifications, in accordance with the delivered service data.

Further, the banner advertisement server 101 verifies the payment method registered by each client through the client data base (CTDB) 112. For example, when the payment by the client is the contract bank transfer using the client bank account, the calculated fee is automatically transferred from the client bank account to a bank account of the maintenance company 100.

Figure 26:
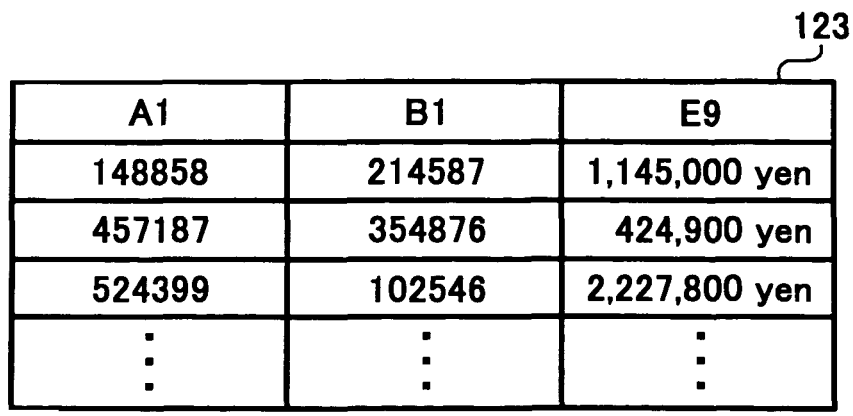
FIG. 26 is a data table of a service provision fee data base connected to the banner advertisement server of FIG. 8.

Referring to FIG. 26, an example of the service provision fee data base (PFDB) 123 connected to the banner advertisement server 101 of the maintenance company 100 is explained. The PFDB 123 stores the banner advertiser identifications (i.e., the information item A1), the banner advertisement identifications (i.e., the information item B1), and service provision fees as an information item E9.

When the banner advertiser identification (i.e., the information item A1) and the banner advertisement identification (i.e., the information item B1) are stored into the distributive banner-advertisement content data base (DCDB) 114, as shown in FIG. 11, the same banner advertiser identification and the banner advertisement identification are stored as the information items A1 and B1, respectively, in the service provision fee data base (SFDB) 123.

The banner advertisement server 101 refers to the banner advertisement identification to specify the delivered service data (i.e., the information item E7) in the service provision consolidation data base (PCDB) 120, and calculates the basic service provision fee for the banner advertiser, identified by the banner advertiser identification, in accordance with the delivered service data. The banner advertisement server 101 stores the calculated basic service provision fee as the information item E9 in the service provision fee data base (SFDB) 123.

Further, the banner advertisement server 101 verifies the payment method registered by each banner advertiser (e.g., the banner advertiser 300), identified by the banner advertiser identification, through the banner advertiser data base (BADB) 111. For example, when the payment method registered by the banner advertiser 300 is the contract bank transfer, an amount obtained by subtracting a fee for collecting the charge from the machine user 200 from the calculated fee is automatically transferred from the maintenance company 100 to the bank account of the banner advertiser 300.

With this structure, the banner advertiser 300 can collects the service provision fees from the machine users including the machine user 200 without newly establishing a system.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2002-281778 filed on Sep. 26, 2002 in the Japanese Patent Office, the entire contents of which are incorporated by reference herein.

What is claimed is:

1. An information processing apparatus, comprising:
    a communications interface configured to communicate with a banner advertiser and an image forming apparatus via a network;
    a distributing server configured to distribute banner advertisements from the banner advertiser to the image forming apparatus, for storage in the image forming apparatus;
    a counter database configured to store a number of banner advertisements displayed at the image forming apparatus; and
    a charging server configured to charge a fee to the banner advertiser based on the number of banner advertisements displayed at the image forming apparatus.

2. The information processing apparatus according to claim 1, further comprising:
    an ordering data collector configured to collect data of a number of advertised products or services ordered from the image forming apparatus in response to displayed banner advertisements for a corresponding products or services.

3. The information processing apparatus according to claim 2, the charging server further configured to charge a fee to the image forming apparatus based on the number of banner advertisements displayed at the image forming apparatus, wherein the fee to the image forming apparatus is discounted based on the number of advertised products or services ordered from the image forming apparatus.

4. An information processing apparatus, comprising:
communications interfacing means for communicating with a banner advertiser and an image forming apparatus via a network;
means for distributing banner advertisements from the banner advertiser to the image forming apparatus, for storage in the image forming apparatus;
means for storing a number of banner advertisements displayed at the image forming apparatus; and
means for charging a fee to the banner advertiser based on the number of banner advertisements displayed at the image forming apparatus.

5. The information processing apparatus according to claim 4, further comprising:
means for collecting data of a number of advertised products or services ordered from the image forming apparatus in response to displayed banner advertisements for a corresponding products or services.

6. The information processing apparatus according to claim 5, the means for charging further charging a fee to the image forming apparatus based on the number of banner advertisements displayed at the image forming apparatus, wherein the fee to the image forming apparatus is discounted based on the number of advertised products or services ordered from the image forming apparatus.

7. A banner advertisement method, comprising steps of:
providing an information processing apparatus;
connecting the information processing apparatus to a banner advertiser and an image forming apparatus via a network;
distributing banner advertisements to the image forming apparatus, for storage in the image forming apparatus, from the banner advertiser via the information processing apparatus;
displaying, at the image forming apparatus, a number of banner advertisements stored in the image forming apparatus, when the image forming apparatus is in a non-operative state; and
charging, by the information processing apparatus, a fee to the banner advertiser based on the number of banner advertisements displayed at the image forming apparatus.

8. The banner advertisement method according to claim 7, further comprising:
the image forming apparatus ordering a number of advertised products or services based on banner advertisements displayed at the image forming apparatus; and
the information processing apparatus collecting data of the number of advertised products or services ordered at the image forming apparatus.

9. The banner advertisement method according to claim 8, the charging by the information processing apparatus including charging a fee to the image forming apparatus based on the number of banner advertisements displayed at the image forming apparatus, wherein the fee to the image forming apparatus is discounted based on the number of advertised products or services ordered from the image forming apparatus.

* * * * *